(12) United States Patent
Kishore et al.

(10) Patent No.: US 12,314,543 B2
(45) Date of Patent: May 27, 2025

(54) VIRTUAL WHITEBOARDING APPLICATION FOR VISUALIZING AND ORGANIZING ISSUES FROM AN ISSUE TRACKING SYSTEM

(71) Applicants: Atlassian Pty Ltd., Sydney (AU); Atlassian US, Inc., San Francisco, CA (US)

(72) Inventors: Abhinav Kishore, Sydney (AU); Mario Nebl, Sydney (AU); Jonathan George Katahanas, Sydney (AU); Natalie Kate Johnson, Sydney (AU); Cornelis Jacobus Alant, Sydney (AU); Damien Clarke, Hobart (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/128,634

(22) Filed: Mar. 30, 2023

(65) Prior Publication Data

US 2024/0329807 A1 Oct. 3, 2024

(51) Int. Cl.
*G06F 3/0484* (2022.01)
*G06F 9/54* (2006.01)
*G06Q 10/10* (2023.01)

(52) U.S. Cl.
CPC .............. *G06F 3/0484* (2013.01); *G06F 9/54* (2013.01); *G06Q 10/10* (2013.01)

(58) Field of Classification Search
CPC .......... G06F 3/0484; G06F 9/54; G06Q 10/10
See application file for complete search history.

(56) References Cited

U.S. PATENT DOCUMENTS

| | | | |
|---|---|---|---|
| 11,336,533 B1* | 5/2022 | Bogado | H04L 41/044 |
| 11,435,871 B1* | 9/2022 | Luvaas | G06F 3/0486 |
| 2004/0263475 A1* | 12/2004 | Wecker | G06F 3/04812 |
| | | | 345/157 |
| 2007/0130541 A1* | 6/2007 | Louch | G06F 3/04817 |
| | | | 715/804 |
| 2015/0154361 A1* | 6/2015 | Barsoum | G16H 10/60 |
| | | | 705/3 |
| 2020/0097504 A1* | 3/2020 | Sequeda | G06F 16/367 |
| 2022/0342534 A1* | 10/2022 | Chen | G06Q 10/103 |
| 2023/0325049 A1* | 10/2023 | Yadav | G06F 3/0482 |
| | | | 715/764 |

* cited by examiner

*Primary Examiner* — Tan H Tran
(74) *Attorney, Agent, or Firm* — Brownstein Hyatt Farber Schreck, LLP

(57) ABSTRACT

A virtual whiteboarding application is configured to interface with an issue tracking system to visualize and organize issues managed by the issue tracking system in a graphical user interface of the virtual whiteboarding application. Graphical elements corresponding to issues managed by the issue tracking system can be interacted with in the graphical user interface of the virtual whiteboarding application to relate issues in the issue tracking system and visualize relationships between issues managed by the issue tracking system.

20 Claims, 23 Drawing Sheets

FIG. 4

VIRTUAL WHITEBOARDING APPLICATION FOR VISUALIZING AND ORGANIZING ISSUES FROM AN ISSUE TRACKING SYSTEM

TECHNICAL FIELD

Embodiments described herein relate generally to techniques for visualizing and organizing issues managed by an issue tracking system in a virtual whiteboarding application.

BACKGROUND

Modern enterprises and collaboration platforms typically enable a group of users to collaborate with each other, for example, using electronic documents or other shared media. However, structured media can make it difficult to collaborate with multiple users concurrently or in a shared session. The systems and techniques described herein may be used to define a contemporaneous electronic collaboration system that can interface with other applications or platforms.

SUMMARY

Embodiments described herein relate generally to techniques for visualizing and organizing issues managed by an issue tracking system in a virtual whiteboarding application. In one embodiment, a computer-implemented method of organizing issues in a virtual whiteboarding application includes causing display of a graphical user interface of the virtual whiteboarding application at a client device. The graphical user interface may include a shared editor region configured to generate graphical elements in response to input received from one or more users. A first issue graphical element may be caused to be displayed in the shared editor region. The first issue graphical element may be a selectable graphical element having metadata extracted from a first issue managed by an issue tracking system. A second issue graphical element may be caused to be displayed in the shared editor region. The second issue graphical element may have metadata extracted from a second issue managed by the issue tracking system. In response to user input provided to the first issue graphical element, a relational wiring graphical element may be caused to be displayed connected to the first issue graphical element. In response to a user input directing the relational wiring graphical element to the second issue graphical element, the relational wiring graphical element may be connected to the second issue graphical element, and a relationship selector graphical element configured to accept user input specifying a type of relationship between issue graphical elements may be caused to be displayed. In response to user input selecting a relationship type at the relationship selector graphical element, an application programming interface (API) call to the issue tracking system to create a relationship between the first issue and the second issue may be generated.

In one embodiment, the API call is a first API call. Causing display of the first issue graphical element may include, in response to user input provided to the shared editor region, causing display of an object creation interface, the object creation interface having a query field and a query result region. In response to user input to the query field, an issue query to the issue tracking system may be generated using a second API call, a set of matching issues satisfying the issue query from the issue tracking system may be received, and for each matching issue of the set of matching issues, a result graphical element may be generated in the query result region, where each result graphical element has metadata extracted from the matching issue. In response to user input selecting a result graphical element having metadata extracted from the first issue, the first issue graphical element may be displayed.

In one embodiment, causing display of the second issue graphical element may include, in response to user input provided to the shared editor region, causing display of an object creation interface, the object creation interface having one or more input fields for receiving user input. In response to receiving user input in the one or more input fields, a third API call to the issue tracking system to cause the second issue to be created may be generated. Further, the second issue graphical element may be displayed.

In one embodiment, the shared editor region is configured to generate graphical elements in response to concurrent inputs received from multiple users.

In one embodiment, the user input directing the relational wiring graphical element to the second issue graphical element is a cursor dragging operation that is initiated at the first issue graphical element and terminates near the second issue graphical element.

In one embodiment, in response to user input provided to a relational wiring graphical region of the first issue graphical element, a relational wiring control graphical element may be caused to be displayed. The relational wiring graphical element may be displayed in response to user input provided to the relational wiring control graphical element.

In one embodiment, the relational wiring control graphical element may be generated in response to a hover operation over the relational wiring graphical region.

In one embodiment, in response to user input selecting the relationship type, the relationship selector graphical element may be hidden.

In one embodiment, in response to user input provided to the wiring control graphical element, the relationship selector graphical element may be caused to be displayed. In response to user input updating the relationship type at the relationship selector graphical element, a second API call to the issue tracking system to cause the relationship type between the first issue and the second issue may be changed from a first relationship type to a second relationship type may be generated.

In one embodiment, the user input selecting the relationship type is provided by a first user and the user input updating the relationship type is provided by a second user different than the first user.

In one embodiment, a computer-implemented method of organizing issues in a virtual whiteboarding application includes causing display of a graphical user interface of the virtual whiteboarding application at a client device. The graphical user interface may include a shared editor region configured to generate graphical elements in response to input received from one or more users. A first issue graphical element may be caused to be displayed in the shared editor region. The first issue graphical element may be selectable to cause display of a first issue in an issue tracking system, and may include data extracted from the first issue. A second issue graphical element may be caused to be displayed in the shared editor region. The second issue graphical element may be selectable to display a second issue in the issue tracking system, and may include data extracted from the second issue. In response to an input dragging operation in the shared editor region initiated at the first issue graphical element and ending near the second issue graphical element, a relational wiring graphical element may be caused to be displayed connected between the first issue graphical element and the second issue graphical element, and a first API call to the issue tracking system to create a relationship between the first issue and the second issue may be generated. In response to user input updating a relationship type between the first issue graphical element and the second issue graphical element, a second API call to the issue tracking system to cause a change in the relationship type between the first issue and the second issue may be generated.

In one embodiment, causing display of the first issue graphical element may include, in response to user input provided to the shared editor region, causing display of an object creation interface, the object creation interface having a query field and a query result region. In response to user input to the query field, an issue query to the issue tracking system may be generated using a third API call, a set of matching issues satisfying the issue query from the issue tracking system may be received, and for each matching issue of the set of matching issues, a result graphical element may be generated in the query result region, where each result graphical element has metadata extracted from the matching issue. In response to user input selecting a result graphical element having metadata extracted from the first issue, the first issue graphical element may be displayed.

In one embodiment, causing display of the second issue graphical element may include, in response to user input provided to the shared editor region, causing display of an object creation interface, the object creation interface having one or more input fields for receiving user input. In response to receiving user input in the one or more input fields, a fourth API call to the issue tracking system to cause the second issue to be created may be generated. Further, the second issue graphical element may be displayed.

In one embodiment, in response to user input provided to a relational wiring graphical region of the first issue graphical element, a relational wiring control graphical element may be caused to be displayed. The relational wiring graphical element may be displayed in response to user input provided to the relational wiring control graphical element.

In one embodiment, the relational wiring control graphical element may be generated in response to a hover operation over the relational wiring graphical region.

In one embodiment, in response to the input dragging operation, a relationship type selector graphical element may be caused to be displayed, the relationship type selector graphical element configured to accept an initial relationship type, wherein the initial relationship type is determined in response to a third API call to the issue tracking system.

In one embodiment, a computer-implemented method of organizing issues in a virtual whiteboarding application includes causing display of a graphical user interface of the virtual whiteboarding application at a client device. The graphical user interface may include a shared editor region configured to generate graphical elements in response to input received from one or more users. A first issue graphical element may be caused to be displayed in the shared editor region. The first issue graphical element may have metadata extracted from a first issue in an issue tracking system. A second issue graphical element may be caused to be displayed in the shared editor region. The second issue graphical element may have metadata extracted from a second issue in the issue tracking system. In response to user input provided to the first issue graphical element, a relational wiring graphical element may be caused to be displayed connected to the first issue graphical element. In response to an input dragging operation, the relational wiring graphical element may be connected to the second issue graphical element and a relationship selector graphical element configured to accept user input specifying a type of relationship between issue graphical elements may be caused to be displayed. In response to user input selecting a relationship type at the relationship selector graphical element, an API call to the issue tracking system to create a relationship between the first issue and the second issue may be generated.

In one embodiment, the API call is a first API call. Causing display of the first issue graphical element may include, in response to user input provided to the shared editor region, causing display of an object creation interface, the object creation interface having a query field and a query result region. In response to user input to the query field, an issue query to the issue tracking system may be generated using a second API call, a set of matching issues satisfying the issue query from the issue tracking system may be received, and for each matching issue of the set of matching issues, a result graphical element may be generated in the query result region, where each result graphical element has metadata extracted from the matching issue. In response to user input selecting a result graphical element having metadata extracted from the first issue, the first issue graphical element may be displayed.

In one embodiment, causing display of the second issue graphical element may include, in response to user input provided to the shared editor region, causing display of an object creation interface, the object creation interface having one or more input fields for receiving user input. In response to receiving user input in the one or more input fields, a third API call to the issue tracking system to cause the second issue to be created may be generated. Further, the second issue graphical element may be displayed.

In one embodiment, in response to user input updating the relationship type between the first issue graphical element and the second issue graphical element, a second API call to the issue tracking system to cause the relationship type between the first issue and the second issue to be changed from a first relationship type to a second relationship type may be generated.

In one embodiment, in response to user input provided to a relational wiring graphical region of the first issue graphical element, a relational wiring control graphical element may be caused to be displayed. The relational wiring graphical element may be displayed in response to user input provided to the relational wiring control graphical element.

In one embodiment, the relational wiring control graphical element may be generated in response to a hover operation over the relational wiring graphical region.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 4 depicts an example graphical user interface of an issue tracking system, such as described herein.

The use of the same or similar reference numerals in different figures indicates similar, related, or identical items.

Figure 1:
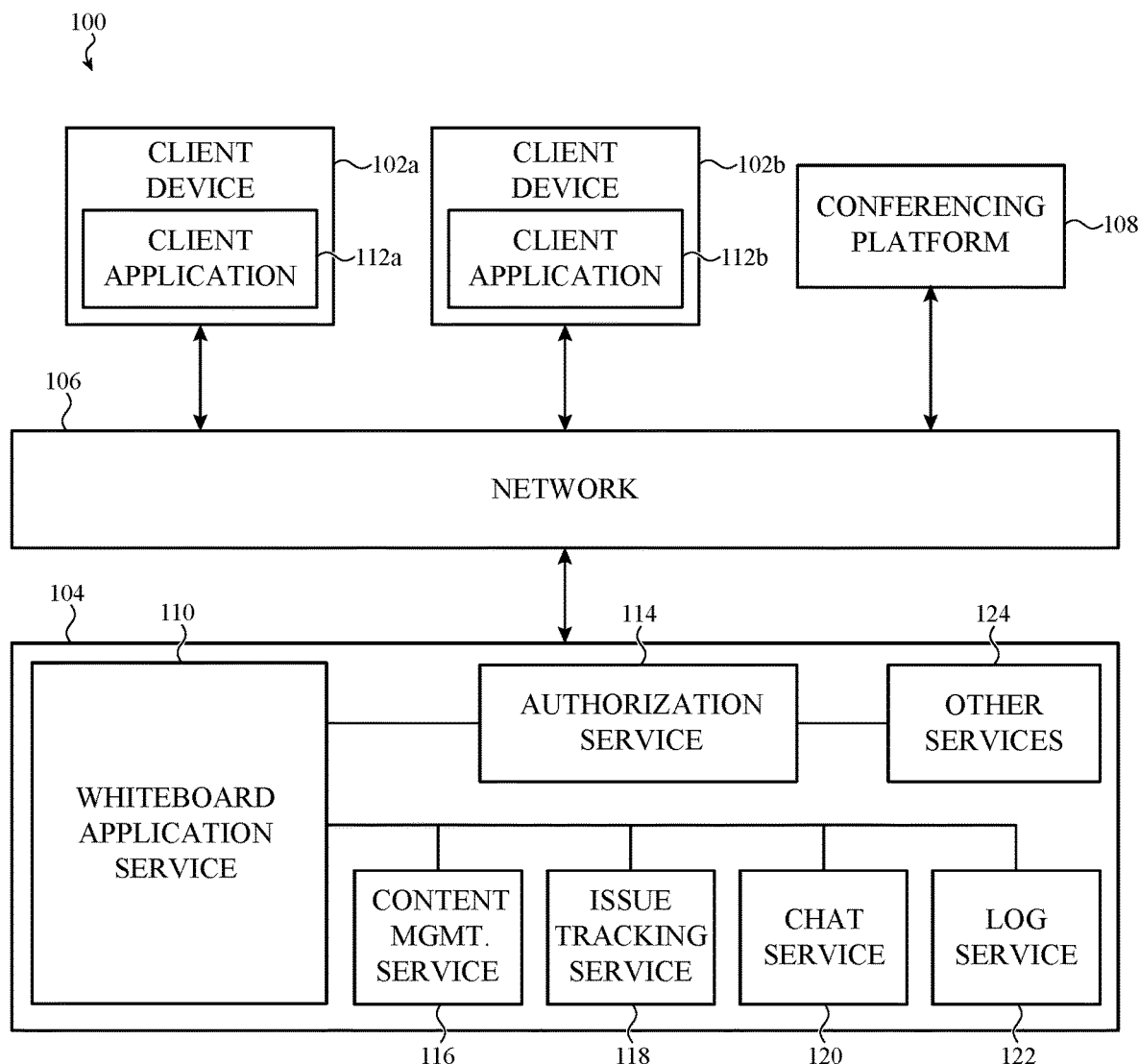
FIG. 1 depicts an example system for collaboration among a group of users, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein are directed to improvements of a virtual whiteboarding application for visualizing and organizing issues managed by an issue tracking system. The virtual whiteboarding application may be part of or shared during a video conferencing platform allowing virtual audiovisual meeting functionality to a group of users. Users of the virtual whiteboarding application may participate in a whiteboarding session in which the users create graphical elements including user-generated content. By way of example, the virtual whiteboarding application may allow users to create graphical elements including text, images, screenshots, drawings, data, media, or other content. In some embodiments, the virtual whiteboarding application may be configured to interface with other applications, systems, or platforms for importing data therefrom to display graphical elements corresponding to objects managed by the other applications, systems, or platforms. For example, the virtual whiteboarding application discussed herein may interface with an issue tracking system, which is used to track issues such as those related to software development projects and/or information technology service management (ITSM). In particular, the virtual whiteboarding application may communicate with the issue tracking system via an application programming interface (API) thereof to display graphical elements corresponding to issues managed by the issue tracking system, create new issues in the issue tracking system from user input in the virtual whiteboarding application, relate issues to one another in the issue tracking system based on user input in the virtual whiteboarding application, and visualize relationships between issues managed by the issue tracking system. The graphical elements corresponding to issues managed by the issue tracking system may be selectable and moveable within the virtual whiteboarding application, allowing users to visualize and organize the issues in an intuitive and efficient manner. The graphical elements may also be modifiable, allowing users to update, delete, or otherwise modify issues associated with graphical elements in the graphical user interface of the virtual whiteboarding application, as well as form relationships between issues.

As discussed herein, an issue tracking system provides functionality for keeping track of information related to issues, including information such as who is assigned to work on a particular issue, a description of the issue, a status of the issue, relationships between issues (e.g., if one issue must be resolved before another can be started), or any other information. An issue, or the data representing the issue in the issue tracking system, may be referred to herein as an issue object. Issues may represent tasks that are related to a software development lifecycle, ITSM, or any other project or goal. For example, in a software development context, an issue may represent a task of adding a feature to a software application. As another example, in an ITSM context, an issue may represent a task of updating software on a server. Issues may have relationships with one another. For example, a first issue may block a second issue such that the second issue cannot be started until the first issue is finished. As another example, related tasks (e.g., those related to the same feature or otherwise logically groupable) may be indicated as such in the issue tracking system. As yet another example, tasks that are duplicates of one another may be indicated as such in the issue tracking system. The issue tracking system may keep track of all information related to the issues managed thereby, providing the necessary functionality to allow users to create, modify, and view issues. Further, the issue tracking system may allow multiple users to do so concurrently, so that individuals across an organization can manage issues.

While the issue tracking system may allow users to create issues, modify existing issues, and view issues, among other functionality, there may be times where it is desirable to view and organize issues in a collaborative session. Further, there may be times where it is desirable to visually organize the issues on a virtual whiteboard, quickly create relationships between issues, and visualize relationships between issues. Principles of the present disclosure describe a virtual whiteboarding application configured to interface with an issue tracking system for these purposes. In particular, a virtual whiteboarding application described herein may interface with an issue tracking system to display graphical elements in a graphical user interface, the graphical elements corresponding to issues managed by the issue tracking system. The graphical elements corresponding to issues managed by the issue tracking system may include data or metadata extracted from an issue in the issue tracking system, and may display all or a portion of the data or metadata in the graphical user interface. The virtual whiteboarding application may further allow creation of issues managed by the issue tracking system from a graphical user interface thereof, so that a user can quickly create new issues managed by the issue tracking system without switching context. The graphical elements corresponding to issues may be selectable and moveable in the graphical user interface of the virtual whiteboarding application so that users can intuitively and efficiently visually organize the issues. In one embodiment, the virtual whiteboarding application allows users to specify relationships between issues by connecting graphical wires between the graphical elements corresponding to the issues. Further, the virtual whiteboarding application may allow users to visualize related issues to a particular issue, displaying graphical elements for each related issue and graphical wires between the issue and the related issues in response to a command to do so.

These foregoing and other embodiments are discussed below with reference to FIGS. 1-8. However, those skilled in the art will readily appreciate that the detailed description given herein with respect to these figures is for explanation only and should not be construed as limiting.

FIG. 1 depicts a simplified diagram of a content collaboration system 100. The content collaboration system 100 is depicted in a client-server architecture or client-service architecture, however, those skilled in the art will appreciate that this is merely one example and that other architectures are possible. In accordance with the examples herein, the content collaboration system 100 can be used for collaboration among a group of users by providing a virtual whiteboarding application. The virtual whiteboarding application may interface with a third-party system, such as an issue tracking system, a content management system, or any other third-party system, to execute one or more actions with respect to the third-party system in response to user input in a graphical user interface of the virtual whiteboarding application.

An architecture of the content collaboration system 100 may allow users to start a virtual whiteboarding session in which they can share their ideas with others, visualize and organize issues managed by an issue tracking system, cause one or more actions to be performed with respect to an issue or issues being managed by the issue tracking system, view and modify content items from a content management system, and automatically cause execution of one or more actions with respect to the issue tracking system and/or the content management system. By way of a non-limiting example, user input provided to graphical elements corresponding to issues being managed by the issue tracking system may cause the issue tracking system to create a relationship between the issues.

In the exemplary content collaboration system 100, multiple client devices 102, including a first client device 102a and a second client device 102b, may access a host server 104, which may be one of a set of host servers, via a computer network 106. The host server 104 may be referred to herein as a collaboration platform server 104. The computer network 106 may include a distributed network including local networks, gateways, and networking services provided by one or more internet service providers. The client devices 102 may be able to collaborate with each other and other users via a conferencing platform 108 and the collaboration platform server 104, which may provide a virtual whiteboarding application service 110. The conferencing platform 108 may provide audio, video, and/or audiovisual conferencing services, including the scheduling of a whiteboarding session via the virtual whiteboarding application service 110 and/or scheduling of an online conference or meeting. In particular, the conferencing platform 108 may allow users to start and/or end a virtual whiteboarding session, start and/or end an online meeting, start and/or end recording of a virtual whiteboarding session or online meeting, or the like. Users may thus interact with the virtual whiteboarding application service 110 directly, or indirectly through an instance that is shared via the conferencing platform 108 (e.g., via screen sharing or screen control). While shown separately, the conferencing platform 108 may be part of the collaboration platform server 104 in some embodiments.

The virtual whiteboarding application service 110 may cause a graphical user interface to be displayed at each of the client devices 102. In particular, the virtual whiteboarding application service 110 may cause a client application 112, also referred to as a virtual whiteboarding frontend application, to be instantiated at each of the client devices 102. More specifically, the virtual whiteboarding application service 110 may cause a first client application 112a to be instantiated at the first client device 102a and a second client application 112b to be instantiated at the second client device 102b. The client applications 112 may be dedicated client-side applications (i.e., "native" applications), or may be web applications executed in a web browser. The client applications 112 may interface with one or more backend systems or applications of the host server 104, such as a virtual whiteboarding backend application provided by the virtual whiteboarding application service 110. While not shown, the client devices 102 typically include at least one display, at least one processing unit, at least one computer memory, and other hardware components. An example device including hardware elements is described below with respect to FIG. 8.

Accordingly, the virtual whiteboarding application service 110 may provide a virtual whiteboarding frontend application at one or more client devices 102 and a virtual whiteboarding backend application at one or more host servers 104. The combination of the virtual whiteboarding frontend application and the virtual whiteboarding backend application may be referred to generally as a virtual whiteboarding application. The virtual whiteboarding frontend application may communicate with the virtual whiteboarding backend application to accomplish the functionality discussed herein. As discussed above, the virtual whiteboarding frontend application may be instantiated at one or more client devices 102. The virtual whiteboarding backend application may be instantiated by one or more computing resources (e.g., one or more processing resources in cooperation with one or more memory resources) at one or more host servers 104. Notably, the foregoing architecture is merely one of many that may be used to provide the functionality described herein, and is not intended to limit the scope of the present disclosure.

The graphical user interface displayed by the client applications 112 at each of the client devices 102 may provide views such as those discussed below with respect to FIGS. 2A—2K and 3A-3F. The graphical user interface may allow users to create graphical elements including user-generated content (e.g., text, images, screenshots, drawings, data, media, etc.), select, move, and delete graphical elements, generate graphical elements corresponding to objects managed by third-party systems (e.g., issues managed by an issue tracking system), and modify objects managed by third-party systems by interacting with the graphical user interface. In particular, the graphical user interface may generate graphical elements in response to concurrent inputs received from multiple users, allowing for real-time collaboration between users of the virtual whiteboarding application.

In addition to the virtual whiteboarding application service 110, the host server 104 may provide additional platforms and/or services. For example, the host server 104 may also include an authorization service 114, a content management service 116, an issue tracking service 118, a chat service 120, a logging service 122, and one or more other services 124. The authorization service 114 may authenticate and authorize users to use the virtual whiteboarding application service 110, the content management service 116, the issue tracking service 118, the chat service 120, the logging service 122, and the one or more other services 124. The authorization service 114 may determine the permissions and capabilities of a user for any of these services, including what a particular user is able to access, view, and modify. The chat service 120 may provide a chat or messaging interface, which may be used to provide text and media based chat capabilities along with the virtual whiteboarding application. The logging service 122 may log properties of a whiteboarding session of the virtual whiteboarding application, such as, for example, a start time and an end time of the whiteboarding session, a time when each user of the whiteboarding session joined and/or left the whiteboarding session, etc. The logging information may be used to generate and communicate a report describing various actions performed during the whiteboarding session.

The content management service 116 may provide a content management system for managing content items on behalf of one or more users, allowing user generated content to be collected, organized, viewed, and modified in a collaborative manner. The user generated content may be organized into spaces and pages, for example, and may include text, images, screenshots, data, and other media. Using an interface provided by the content management service 116 such as a plug-in, a module, a library, an API, a microservice, or the like, one or more content items managed by the content management system may be updated, edited, deleted, viewed, and/or searched. In particular, the virtual whiteboarding application service 110 may interface with the content management service 116 (for example, via an API provided by the content management service 116) to visualize content items managed by the content management system and create new content items managed by the content management system. Users may interact with graphical elements corresponding to content items managed by the content management system to change properties of the content items in the content management system. Accordingly, a user of a virtual whiteboarding application described herein is not required to leave the context of the application to perform operations with respect to one or more content items managed by the content management system during a whiteboarding session.

The issue tracking service 118 may provide an issue tracking system for managing issues or tickets on behalf of one or more users as discussed above. Using an interface provided by the issue tracking service 118 such as a plug-in, a module, a library, an API, a microservice, or the like, one or more issues managed by the issue tracking system may be updated, edited, deleted, viewed, and/or searched. In particular, the virtual whiteboarding application service 110 may interface with the issue tracking system (for example, via an API provided by the issue tracking service 118) to visualize issues managed by the issue tracking system and create new issues managed by the issue tracking system. Users may interact with graphical elements corresponding to issues managed by the issue tracking system to change properties of the issues in the issue tracking system. Accordingly, a user of a virtual whiteboarding application described herein is not required to leave the context of the application to perform operations with respect to one or more issues managed by the issue tracking system during a whiteboarding session.

In some embodiments, some or all of the services may be provided by separate host servers 104 from the virtual whiteboarding application service 110, or any other service. For example, any combination of the virtual whiteboarding application service 110, the authorization service 114, the content management service 116, the issue tracking service 118, the chat service 120, the logging service 122, and the one or more other services 124 may be provided by separate or different host servers 104, which may communicate with one another as necessary to provide the functionality discussed herein. In some embodiments, one or more of the services may be combined or further separated. For example, the whiteboarding application service 110 may be part of another service, such as the content management service 116 or the issue tracking service 118. Those skilled in the art will appreciate that myriad architectures exist for providing the services and functionality described herein, and the discussion of the exemplary content collaboration system 100 is not meant to limit the present disclosure to any specific one.

The host server 104 may have a local cache to store an events history corresponding to each of a number of whiteboarding sessions of the virtual whiteboarding application service 110. This may be used to generate and communicate a report describing various actions performed during a whiteboarding session to users participating in the whiteboarding session. Additionally, or alternatively, a local database, remote database, and/or cache (for example, in a cloud environment) may be used to store such an event history.

FIGS. 2A-2K depict example views of a graphical user interface of a virtual whiteboarding application executing on a client device of a user. In particular, FIGS. 2A-2K depict example views of the graphical user interface of the virtual whiteboarding application depicting importing an issue from an issue tracking system as a graphical element, creating a new issue in the issue tracking system and corresponding graphical element, creating a relationship between issues in the issue tracking system, and modifying the relationship between the issues in the issue tracking system.

Figure 2A:
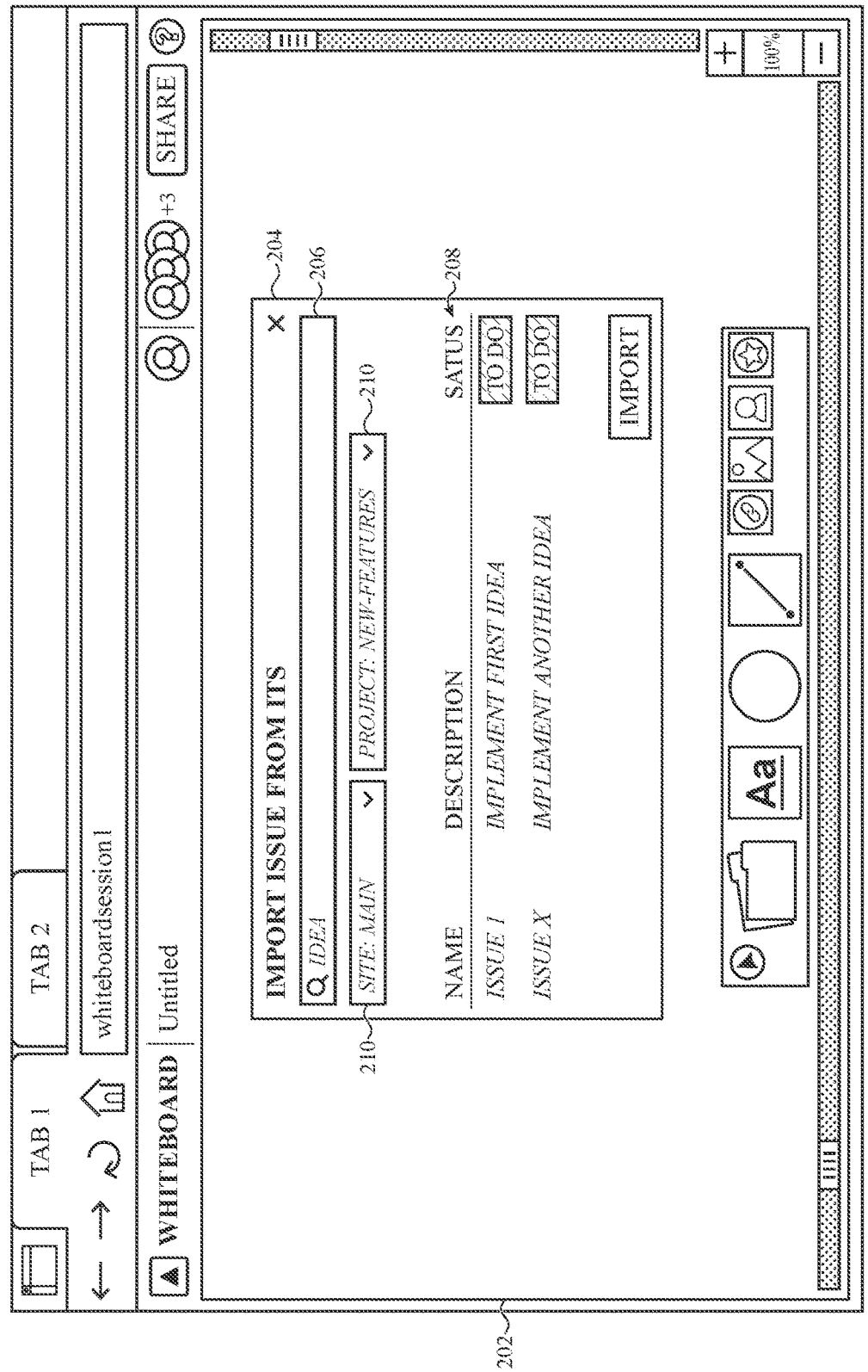
FIGS. 2A-2K depict example views of a virtual whiteboarding application, such as described herein.

FIG. 2A shows a first example view 200a of the graphical user interface of the virtual whiteboarding application. The first example view 200a shows a shared editor region 202 including an object creation interface 204. The shared editor region 202 may also be referred to as a "virtual canvas," "canvas," or "editor region." The object creation interface 204 may be displayed in response to user input in the shared editor region 202, such as a user selecting a graphical element corresponding to a command for creating a graphical element from issue data. The object creation interface 204 may include a query field 206 and a query result region 208. The query field 206 may be configured to accept a search query from a user for searching for existing issues managed by the issue tracking system. The search query may be a word, a part of a word, multiple words, or multiple word/word parts. Alternatively, the search query may be provided in a query language compatible with the issue tracking system. An issue query may be generated from the search query and provided to the issue tracking system. Issues satisfying the issue query may be displayed as result graphical elements in the query result region 208, which may show various details about the matching issues such as a name, a description, and a status. To obtain the issues satisfying the issue query, the issue query may be provided to the issue tracking system, for example, via an API call to the issue tracking system, and a set of matching issues satisfying the search query may be returned. A number of search filtering graphical elements 210 may also be shown, which allow a user to further narrow a search query, for example, to a particular site or project, each of which may contain issues in the issue tracking system. A user may select an issue or issues from the query result region 208 for import. The selected issues may be imported as graphical elements as shown in FIG. 2B.

Figure 2B:
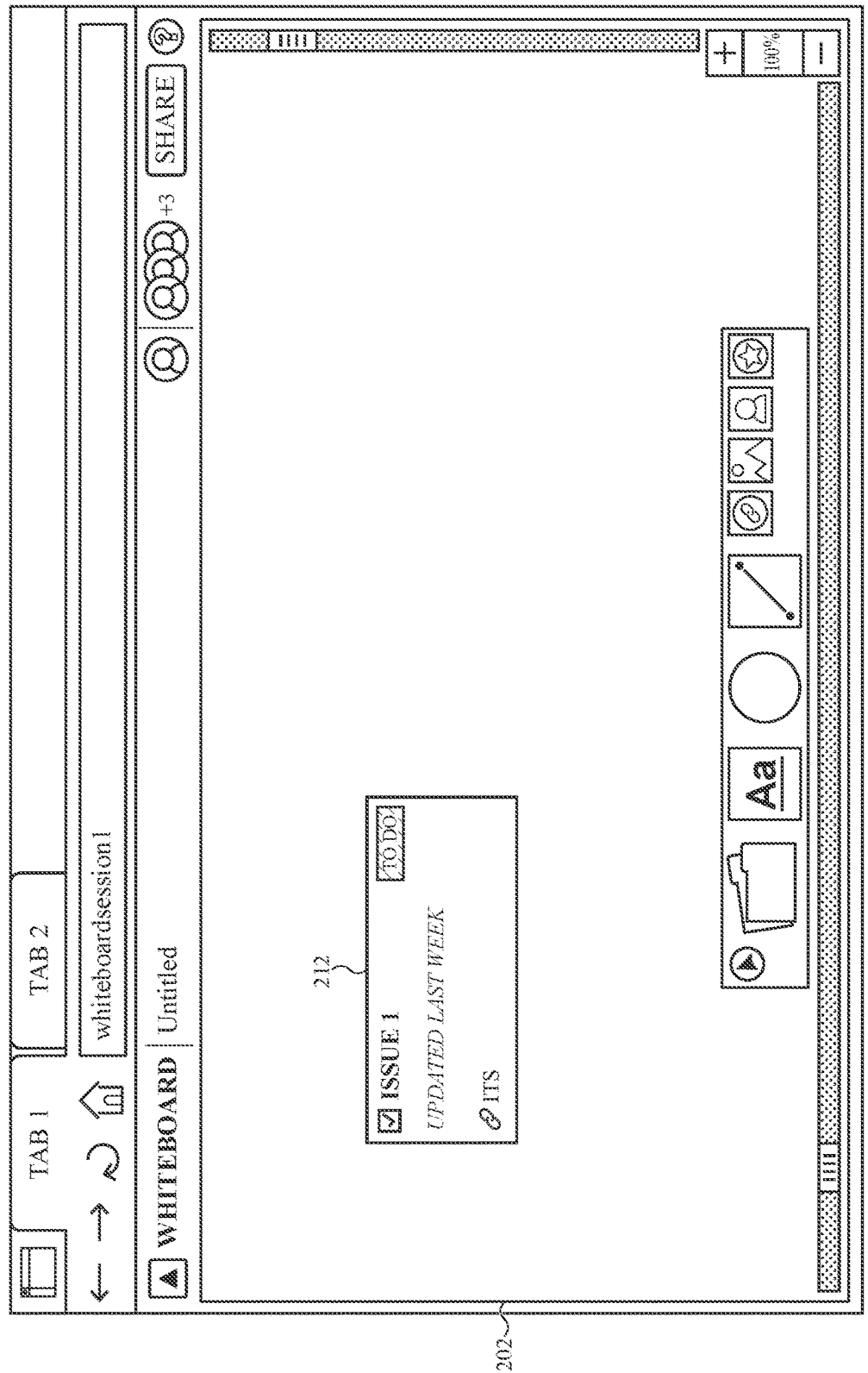

FIG. 2B shows a second example view 200b of the graphical user interface of the virtual whiteboarding application. The second example view 200b shows the shared editor region 202 including a first issue graphical element 212 corresponding a first issue (i.e., first issue object) in the issue tracking system. As discussed herein, a graphical object in the graphical user interface corresponds to an issue in the issue tracking system when it has data or metadata extracted from the issue. The data or metadata may be bidirectionally linked between the virtual whiteboarding application and the issue tracking system, such that changes to an issue in the issue tracking system are reflected in the virtual whiteboarding application, and vice-versa. All or a portion of the data or metadata may be displayed by the issue graphical element. For example, the first issue graphical element 212 shows a name of the first issue, a status of the first issue, an update time of the first issue, and a link, which, when selected, may show further information about the first issue in the graphical user interface of the virtual whiteboarding application and/or cause information about the first issue to be shown in a graphical user interface of the issue tracking system. The first issue graphical element 212 may further be associated with additional data extracted from the first issue as metadata or otherwise, which may be stored by the virtual whiteboarding application, for example, in a cache or database. The first issue graphical element 212 may be selectable and moveable in the shared editor region 202. In some embodiments, selecting the first issue graphical element 212 may show additional information about the first issue, either within the graphical user interface of the virtual whiteboarding application or within a graphical user interface of the issue tracking system.

The first issue graphical element 212 may be contemporaneously displayed for all users participating in a whiteboarding session in the virtual whiteboarding application. Notably, the first issue graphical element 212 may appear or behave differently for users of the virtual whiteboarding application depending on permissions of the user associated with the first issue in the issue tracking system. Turning back to FIG. 1, the authorization service 114 may provide information to the whiteboarding application service 110 regarding permissions of users with respect to the issue tracking system 118 or any other third-party system. In some embodiments, the authorization service 114 may act as a single sign on for both the issue tracking service 118 and the whiteboarding application service 110. Users who are not authorized to view, modify, or otherwise interact with the first issue may have a different user experience in the virtual whiteboarding application than users who are authorized to do the same. For example, a user of the virtual whiteboarding application who is not authorized to view the first issue may see a placeholder in lieu of the first issue graphical element 212, or may see certain information displayed by the first issue graphical element 212 as redacted. As another example, a user of the virtual whiteboarding application who is authorized to view but not modify the first issue in the issue tracking system may be able to view the first issue graphical element 212 normally, but may be limited in the interactions they can perform with the first issue graphical element 212. The virtual whiteboarding service 110 may communicate with the authorization service 114 and/or the issue tracking service 118 to determine the permissions of a user with respect to a particular issue associated with an issue graphical element and display or alter the issue graphical element accordingly.

Figure 2C:
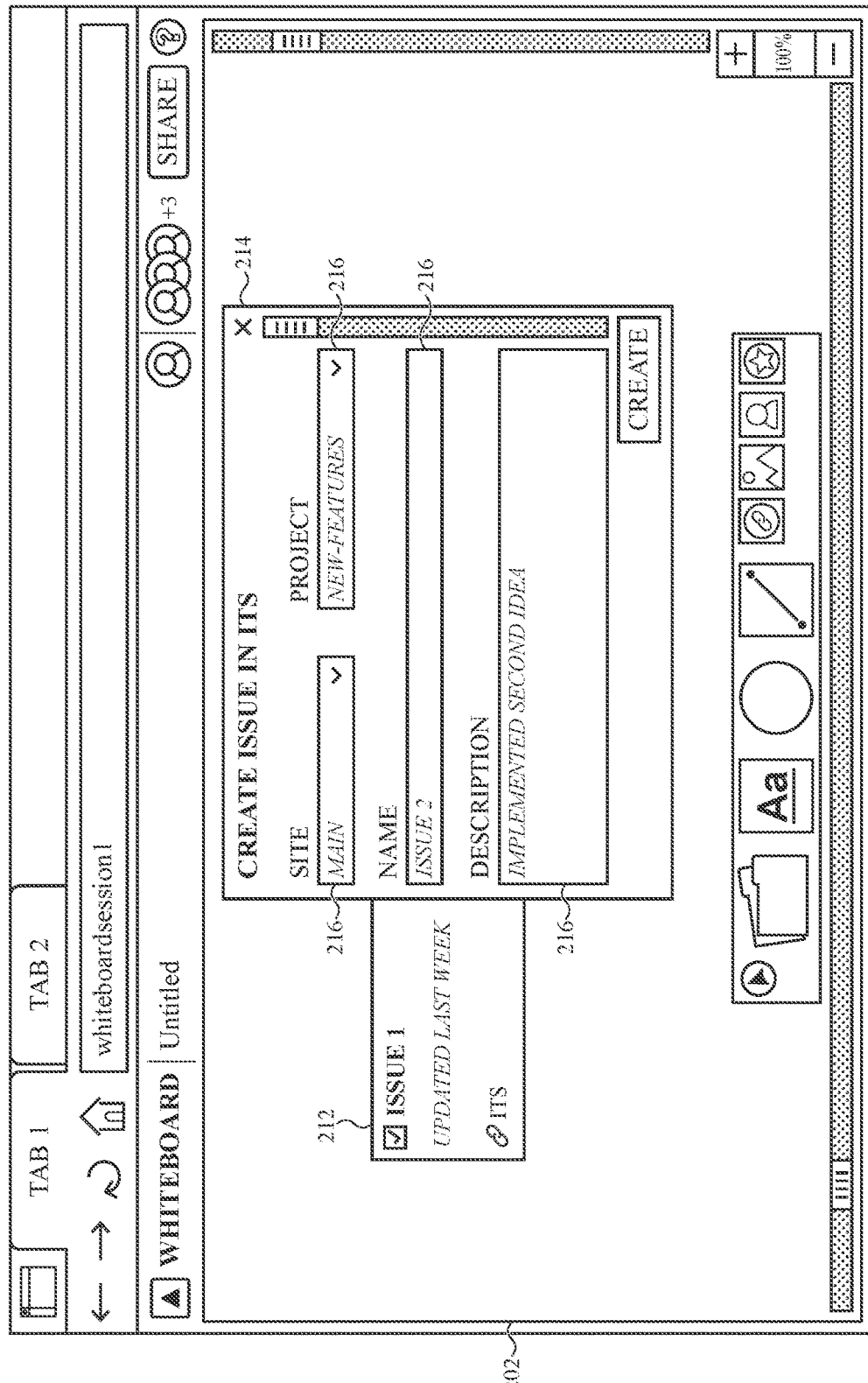

FIG. 2C shows a third example view 200c of the graphical user interface of the virtual whiteboarding application. The third example view 200c shows the shared editor region 202 including the first issue graphical element 212 and an object creation interface 214. The object creation interface 214 may be displayed in response to user input in the shared editor region 202, such as a user selecting a control for creating a new graphical element corresponding to an issue managed by the issue tracking system. The object creation interface 214 may include a number of input fields 216 for collecting information related to a new issue to be created in the issue tracking system. For example, the input fields 216 may include a field for a site to which the new issue belongs, a project to which the new issue belongs, a name of the new issue, and a description of the new issue, among other fields that are not shown. The input fields 216 may be generated in response to interaction with the issue tracking system. For example, an API call to the issue tracking system to obtain a number of default or optional input fields may be generated, and a number of desired input fields may be received in return. The input fields 216 may be generated in response to receiving the desired input fields from the issue tracking system. When a user provides information related to the new issue in the input fields 216, the virtual whiteboarding application may interact with the issue tracking system, for example, via an API of the issue tracking system, to create a new issue based on the provided information in the issue tracking system. In the present example, the newly created issue is referred to as a second issue (i.e., second issue object) in the issue tracking system. Further, the virtual whiteboarding application may display a second issue graphical element in the shared editor region 202 corresponding to the second issue in the issue tracking system, as shown in FIG. 2D.

Similar to the first issue graphical element 212, the second issue graphical element 218 may be displayed contemporaneously to all users participating in a whiteboarding session of the virtual whiteboarding application. Further, the second issue graphical element 218 may appear or behave differently to different users depending on permissions associated with the user for the second issue in the issue tracking system. The first issue graphical element 212 and the second issue graphical element 218 may be contemporaneously repositioned within the shared editor region 202 by any user participating in the whiteboarding session, or otherwise modified.

Figure 2D:
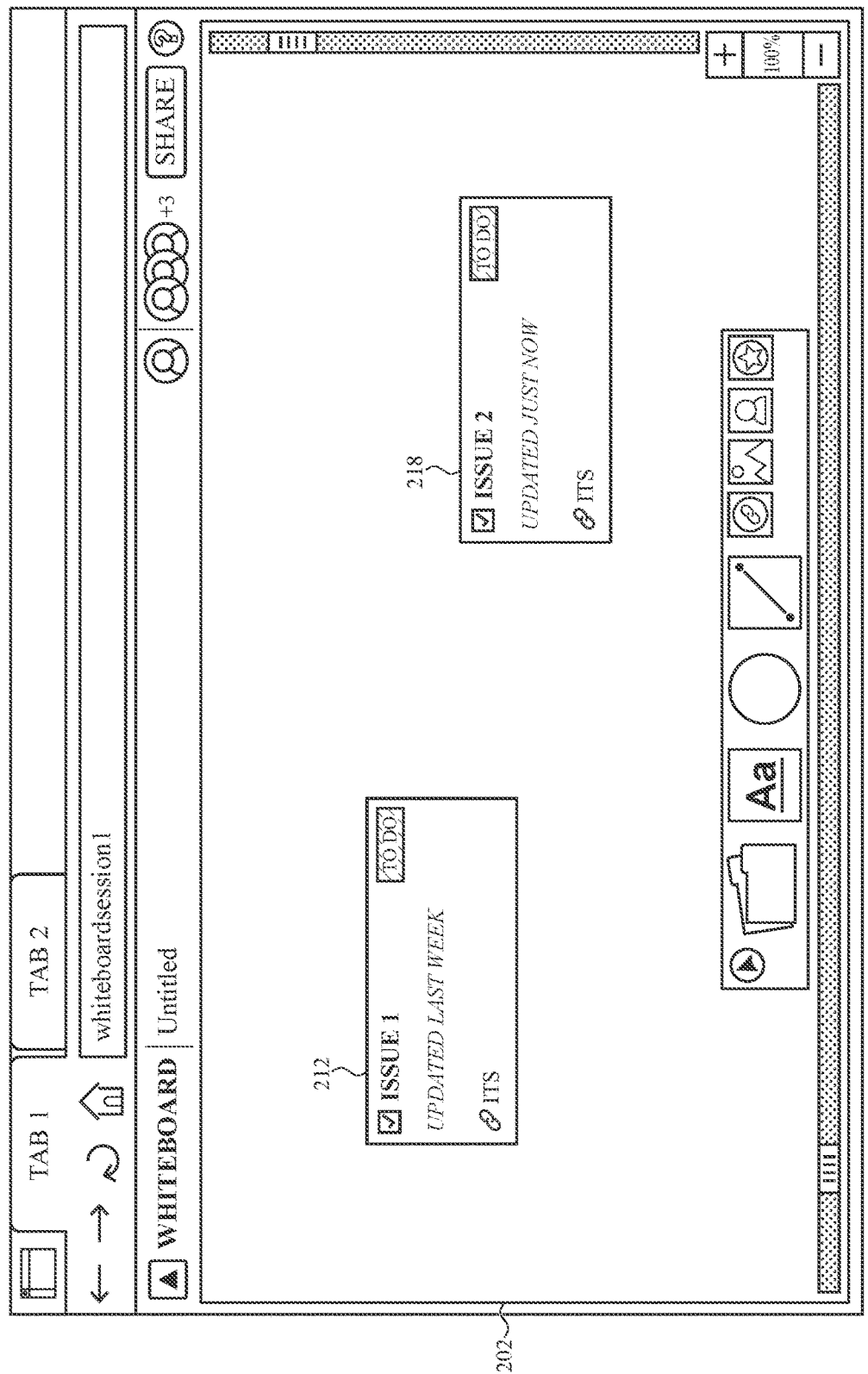

FIG. 2D shows a fourth example view 200d of the graphical user interface of the virtual whiteboarding application. The fourth example view 200d shows the shared editor region 202 including the first issue graphical element 212 and a second issue graphical element 218. The second issue graphical element 218 includes data or metadata extracted from the second issue, and displays some or all of the data or metadata. As shown, the second issue graphical element 218 shows a name of the second issue, a status of the second issue, an update time of the second issue, and a link, which, when selected, may show further information about the second issue in the graphical user interface and/or cause information about the second issue to be shown in a graphical user interface of the issue tracking system. The second issue graphical element 218 may further be associated with additional data extracted from the second issue as metadata or otherwise, which may be stored by the virtual whiteboarding application, for example, in a cache or database. Similar to the first issue graphical element 212, the second issue graphical element 218 may be selectable and moveable in the shared editor region 202. In some embodiments, selecting the second issue graphical element 218 may show additional information about the second issue, either within the graphical user interface of the virtual whiteboarding application or within a graphical user interface of the issue tracking system.

Figure 2E:
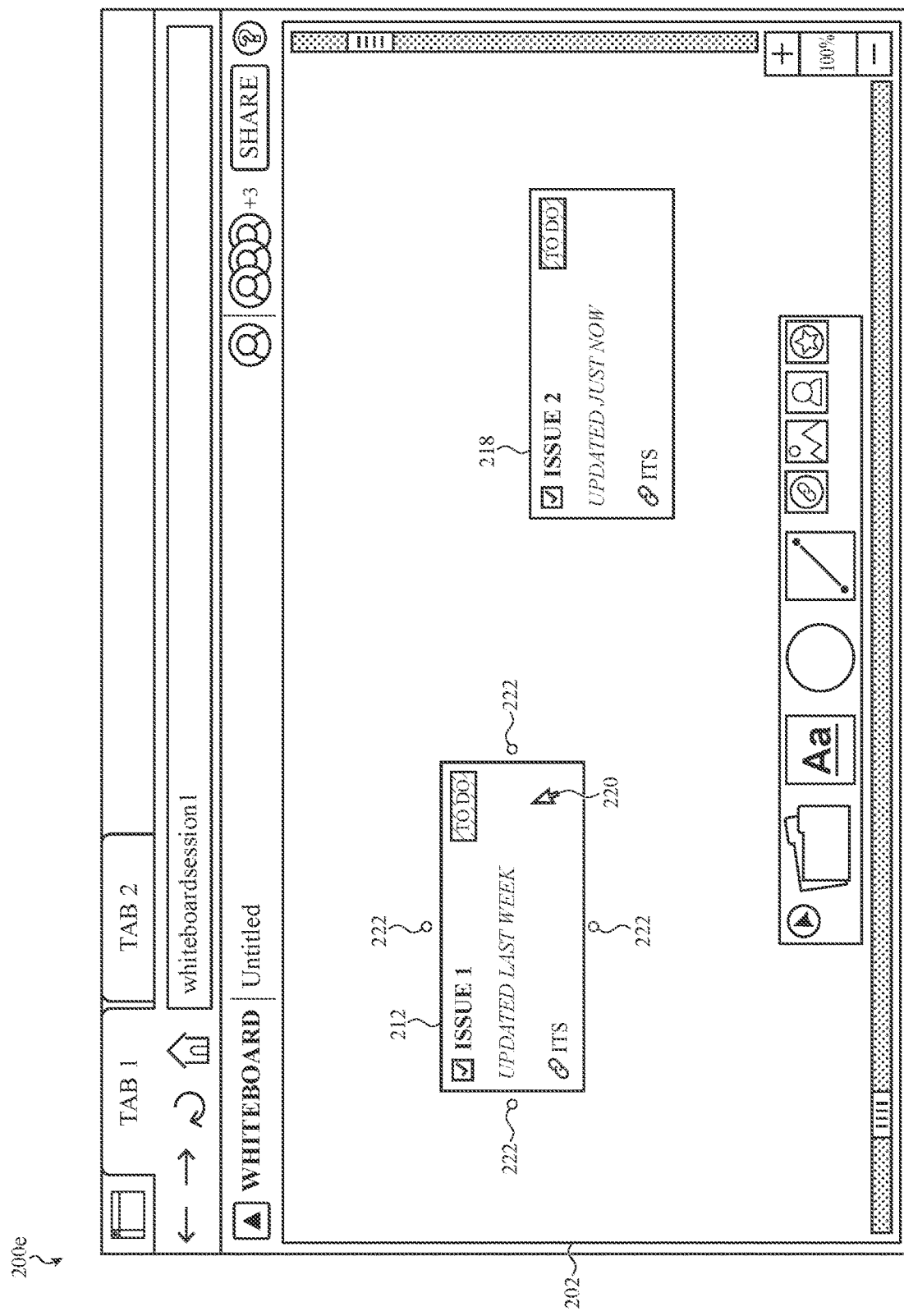

FIG. 2E shows a fifth example view 200e of the graphical user interface of the virtual whiteboarding application. The fifth example view 200e shows the shared editor region 202 including the first issue graphical element 212 and the second issue graphical element 218. Further, the fifth example view 200e shows a cursor 220 hovering over the first issue graphical element 212, which may cause one or more relational wiring control graphical elements 222 to be displayed. While the relational wiring control graphical elements 222 are shown as circles near each edge of the first issue graphical element 212, the relational wiring control graphical elements 222 may be illustrated in any manner. In some embodiments, the relational wiring control graphical elements 222 are displayed in response to user interaction (i.e., the cursor 220 hovering over) with a relational wiring graphical region of the first issue graphical element 212. For example, the relational wiring control graphical elements 222 may be shown in response to the cursor 220 hovering near an edge of the first issue graphical element 212, but not near a center of the first issue graphical element 212. In other embodiments, the relational wiring control graphical elements 222 are displayed in response to user interaction with any part of the first issue graphical element 212.

Figure 2F:
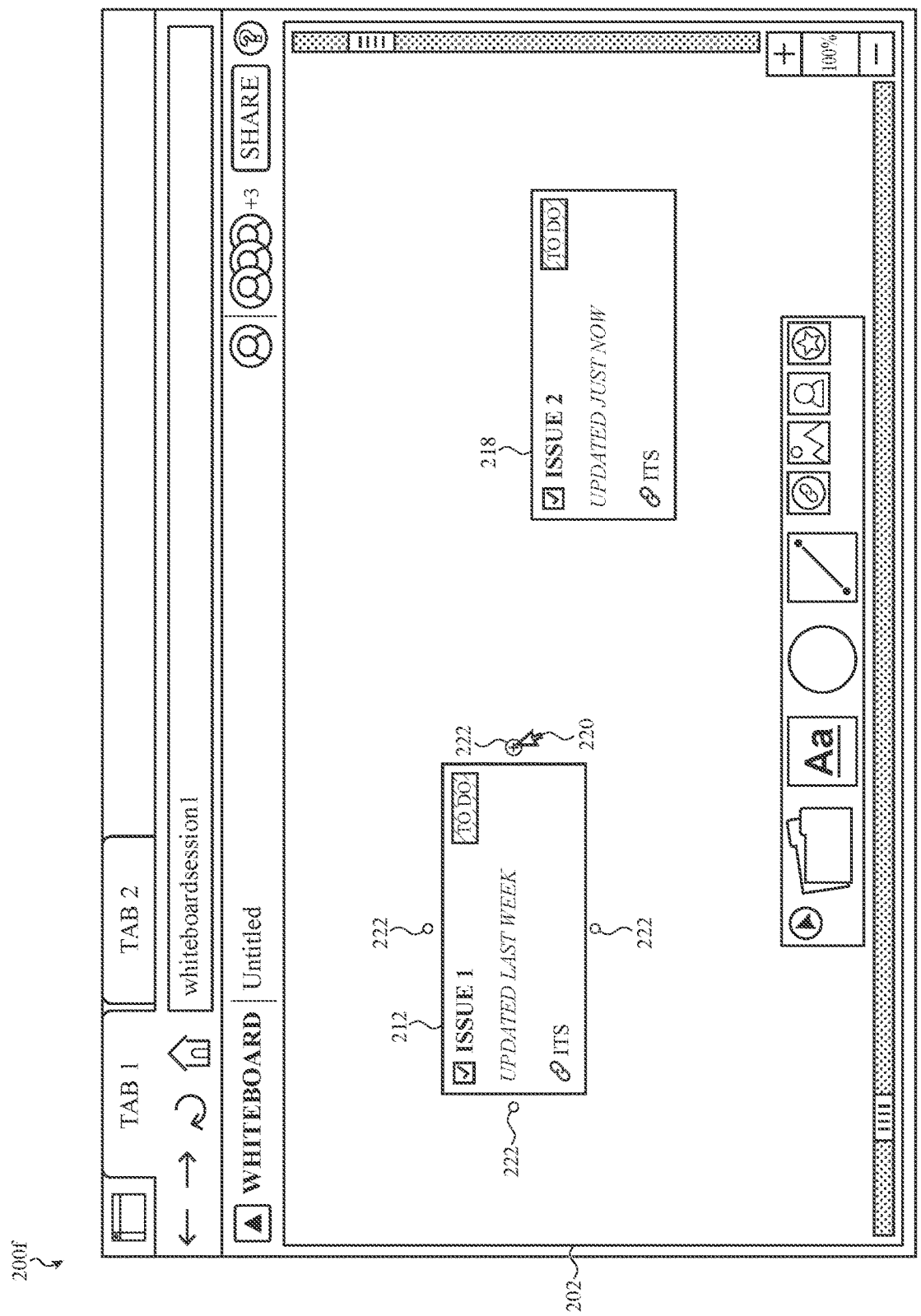

FIG. 2F shows a sixth example view 200f of the graphical user interface of the virtual whiteboarding application. The sixth example view 200f shows the shared editor region 202 including the first issue graphical element 212 and the second issue graphical element 218. Further, the fifth example view 200f shows the cursor 220 hovering over one of the relational wiring control graphical elements 222, which may cause the relational wiring control graphical element 222 to change to prompt user interaction therewith. In the example shown, the one of the relational wiring control graphical elements 222 changes from a circle to a plus sign, growing in size. This may prompt a user to click the relational wiring control graphical element 222 to initiate the display of a relational wiring graphical element as shown in FIG. 2G.

Figure 2G:
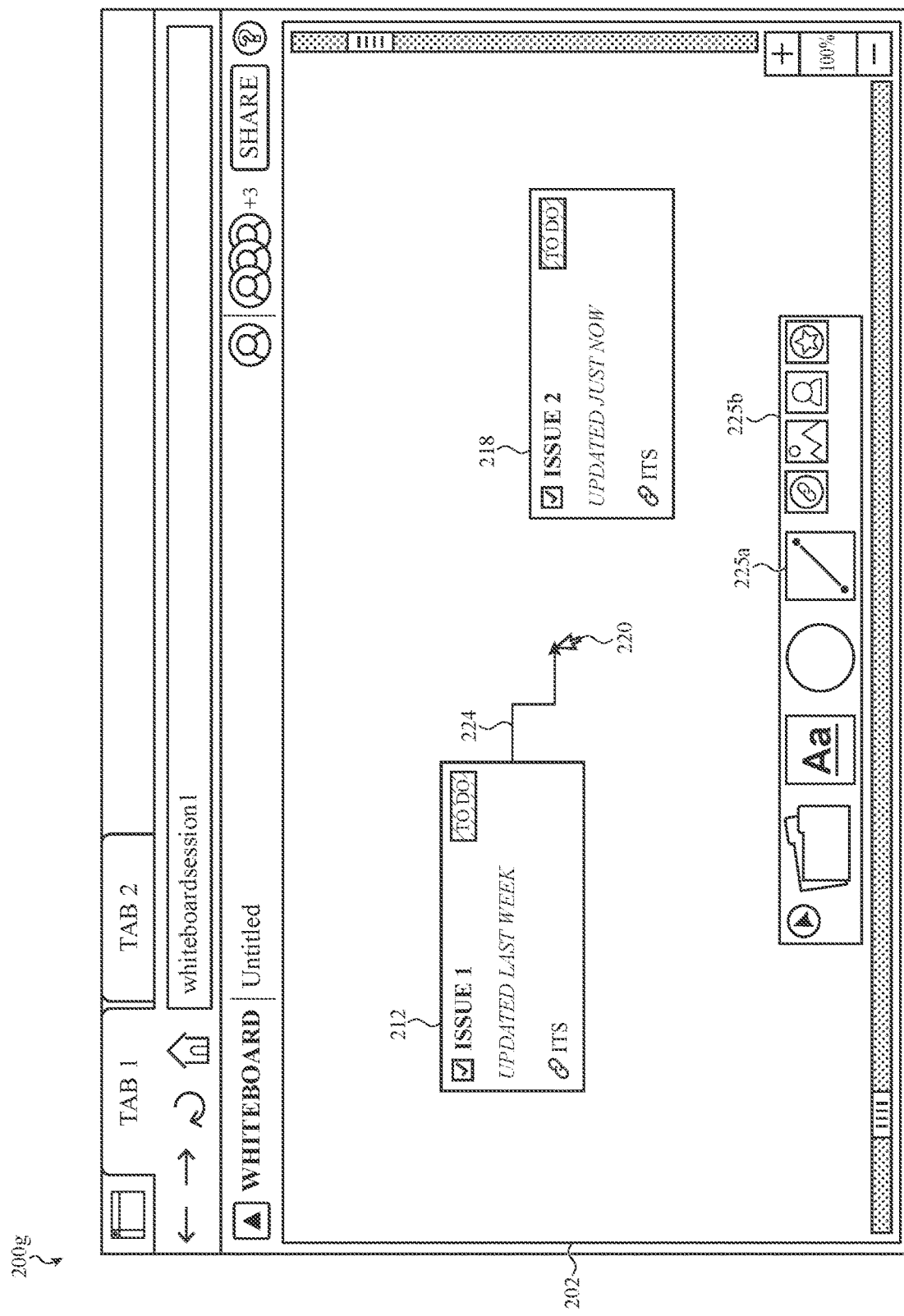

FIG. 2G shows a seventh example view 200g of the graphical user interface of the virtual whiteboarding application. The seventh example view 200g shows the shared editor region 202 including the first issue graphical element 212, the second issue graphical element 218, the cursor 220, and a relational wiring graphical element 224 between the first issue graphical element 212 and the cursor 220. As discussed above, the relational wiring graphical element 224 may be displayed in response to user interaction with one of the relational wiring control graphical elements 222. However, in some embodiments, the relational wiring graphical element 224 may be displayed in response to user interaction with the first issue graphical element 212 in general, and not a relational wiring control graphical element 222 of the first issue graphical element 212. The relational wiring graphical element 224 may be used to relate the first issue graphical element 212 to another issue graphical element in the shared editor region 202, such as the second issue graphical element 218, as discussed below. The relational wiring graphical element 224 may follow the cursor 220 around the shared editor region 202 until it is dismissed or paired with another issue graphical element.

Notably, the seventh example view 200g shows only one exemplary way to create the relational wiring graphical element 224. In some embodiments, the relational wiring graphical element 224 may be created by user interaction with a relational wiring control 225a, which may be located in a toolbar 225b of the graphical user interface of the virtual whiteboarding application or elsewhere. The relational wiring control 225a may cause the creation of a wiring primitive or other native object that can be positioned and connected to various graphical objects in the virtual canvas. In such an embodiment, the relational wiring graphical element 224 may initially be shown in the shared editor region 202 but not connected to any graphical elements, and a user may interact with the relational wiring graphical element 224 to connect a first end to the first issue graphical element 212 and a second end to the second issue graphical element 218. In other embodiments, a context menu displayed in response to a right-click or long press within the shared editor region 202 may allow for creation of the relational wiring graphical element 224. In short, the relational wiring graphical element 224 may be generated in response to any type of user input, not just in response to user interaction with one of the relational wiring control graphical elements 222. The relational wiring graphical element 224 may also be connected between the first issue graphical element 212 and the second issue graphical element 218 in response to any type of user input, not just a dragging operation between the first issue graphical element 212 and the second issue graphical element 218 as described below.

Figure 2H:
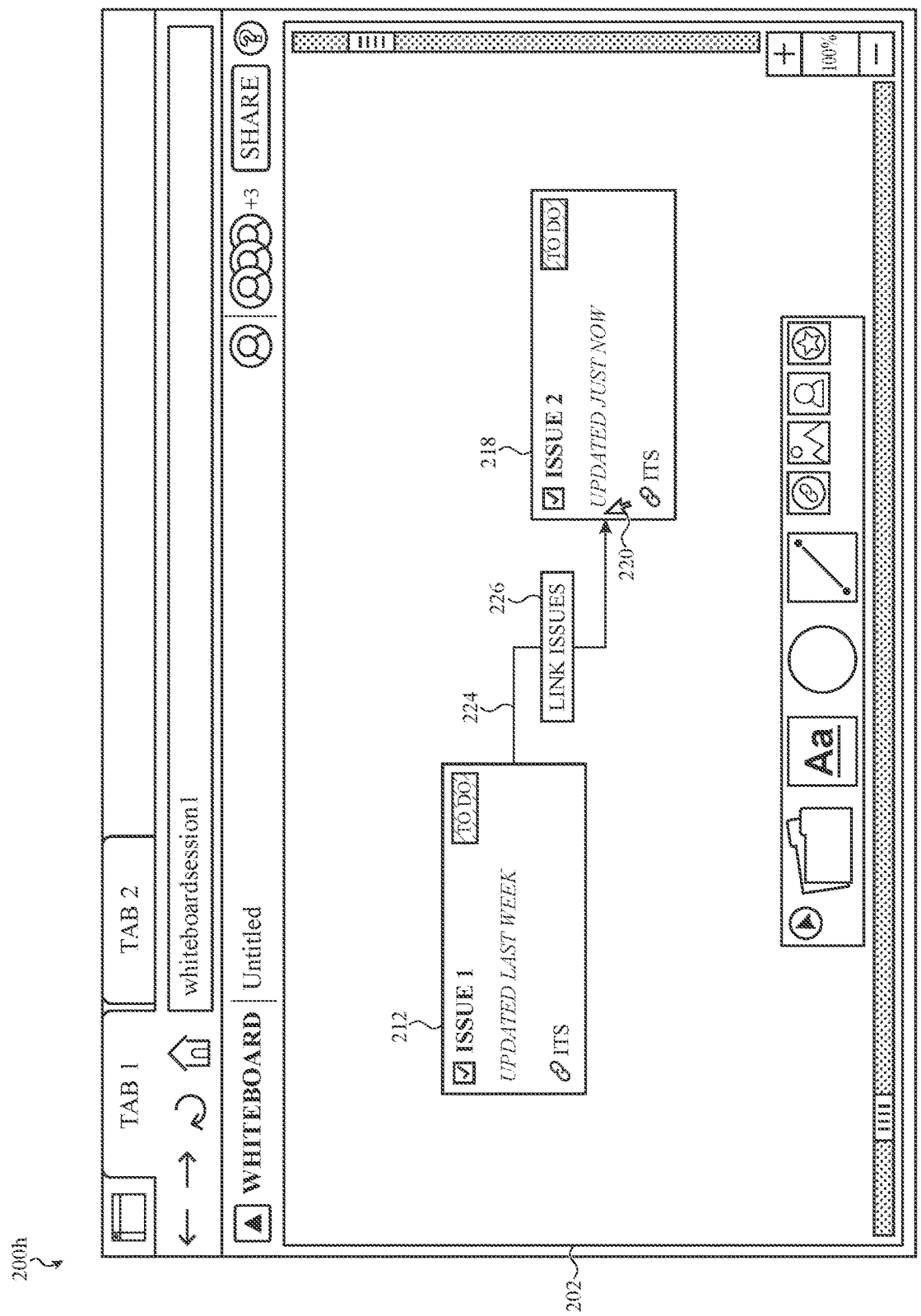

FIG. 2H shows an eighth example view 200h of the graphical user interface of the virtual whiteboarding application. The eighth example view 200h shows the shared editor region 202 including the first issue graphical element 212, the second issue graphical element 218, the cursor 220, and the relational wiring graphical element 224. As shown, the relational wiring graphical element 224 is between the first issue graphical element 212 and the second issue graphical element 218. This may be caused by user interaction with the first issue graphical element 212 and the second issue graphical element 218 (e.g., a dragging operation initiated at or near the first issue graphical element 212 and ending at or near the second issue graphical element 218). Additionally, a link confirmation graphical element 226 may be displayed along the relational wiring graphical element 224 or elsewhere. The link confirmation graphical element 226 may allow a user to confirm a desire to relate the issue graphical elements, and the corresponding issues, connected by a relational wiring graphical element 224. In the present example, the link confirmation graphical element 226 may allow a user to confirm a desire to relate the first issue graphical element 212 and the second issue graphical element 218, and thus the first issue and the second issue in the issue tracking system.

In some embodiments, the virtual whiteboarding application may first determine if the first issue and the second issue can be related. This may involve checking with an integration registry of the virtual whiteboarding application, which may specify different types of graphical elements that can be related (e.g., whether an issue graphical element can be related to another issue graphical element, whether an issue graphical element can be related to a content item graphical element corresponding to a content item in a content management system, whether an issue graphical element can be related to a mockup item graphical element corresponding to a mockup item in an interface design system, or whether any other graphical elements corresponding to objects managed by any third-party systems can be related), and further may involve interacting with the issue tracking system (or any other third-party systems) to determine if the objects managed by the third-party systems (e.g., the first issue and the second issue managed by the issue tracking system) corresponding to the graphical elements can be related. The latter may be performed via an API call to the issue tracking system, for example.

To determine if the first issue and the second issue can be related, a state of each of the first issue and the second issue may be reconciled. This may involve comparing one more data fields associated with each issue against a set of rules. In one example, issues may be associated with an issue type (e.g., task, story, bug, epic), and only certain types of issues may be related to one another. In addition, the issue type, or any other data associated with the issues, may dictate a subset of relationships allowed between the issues and/or a directionality of the relationship between issues. As another example, issues may be associated with a project, and only issues within the same project may be related. As yet another example, issues may be associated with a site, and only issues within the same site may be related. As yet another example, the first issue may be associated with an ITSM task, while the second issue may be associated with a software development project. This may be indicated in any number of fields associated with each issue. A rule may dictate that ITSM and software development issues may not be related, and thus such an action would not be permitted in the virtual whiteboarding application.

In addition to determining if the first issue and the second issue can be related, the virtual whiteboarding application may also determine a set of permissible relationships between the first issue and the second issue, which may be a subset of relationships available between issues generally. For example, issues in the issue tracking system may have relationships such as "is blocked by," "blocks," "is cloned by," "clones," "is duplicated by," "duplicates," "is caused by," "causes," and "relates to." All or a subset of these relationships may be available between the first issue and the second issue, depending on the data associated therewith and rules provided by the virtual whiteboarding system and/or the issue tracking system.

While the primary discussion herein is directed to visualizing and relating issues in an issue tracking system, similar concepts may apply to other third-party systems such as the content management system and an interface design system. For example, the virtual whiteboarding application may also support display of content item graphical elements corresponding to a content item or items managed by the content management system alongside issue graphical elements and mockup item graphical elements corresponding to mockup items in the interface design system. A user may wish to relate a content item graphical element and an issue graphical element, a mockup item graphical element and an issue graphical element, two content item graphical elements, or any other combination of graphical elements corresponding to objects managed by third-party systems. The virtual whiteboarding application may determine whether such a relationship is permissible, for example, by referencing internally stored data such as in an integration registry and/or by interacting with one or more of the third-party systems, before relating the graphical elements and underlying objects they reference in the third-party systems. The virtual whiteboarding application may further determine which types of relationships are available between objects corresponding to graphical elements, for example, by referencing internally stored data such as the integration registry and/or by interacting with one or more of the third-party systems, which may be used to update the graphical user interface as discussed below.

Relating graphical elements in the virtual whiteboarding application may have different effects depending on the objects managed by third-party systems corresponding thereto. For example, if a first graphical element and a second graphical element are note graphical elements that do not correspond to objects managed by a third-party system, but rather are contained exclusively by the virtual whiteboarding application, the relationship between notes may be stored, for example, in a database of the virtual whiteboarding application, with no action taken with respect to any third-party system. In the case of the first issue graphical element and the second graphical element discussed above, the relationship may be created in the issue tracking system, which, as discussed above, may already support the creation of relationships between issues. In the case of an issue graphical element corresponding to an issue in the issue tracking system and a content item graphical element corresponding to a content item in the content management system, creating a relationship may, for example, cause a selectable link to the issue to be displayed as part of the content item in the content management system. As another example, creating the relationship may cause a selectable link to the content item to be displayed as part of the issue in the issue tracking system. As yet another example, event streams between the content item and the issue may be linked, such that when the issue is updated, users associated with the content item or a page in which the content item is located are notified, and vice-versa. As yet another example, events occurring with respect to the issue (e.g., the issue is updated, the issue is completed, the issue is deleted), may trigger events in the content management system, such as notifying one or more users associated with the content item or a page in which the content item is located. In general, relationships between graphical elements and the objects managed by third-party systems corresponding thereto may be stored in the virtual whiteboarding application, the third-party systems, or a combination thereof, and may result in functional links between objects in third-party systems that provide additional functionality to users of the virtual whiteboarding application and/or the third-party systems.

Figure 2I:
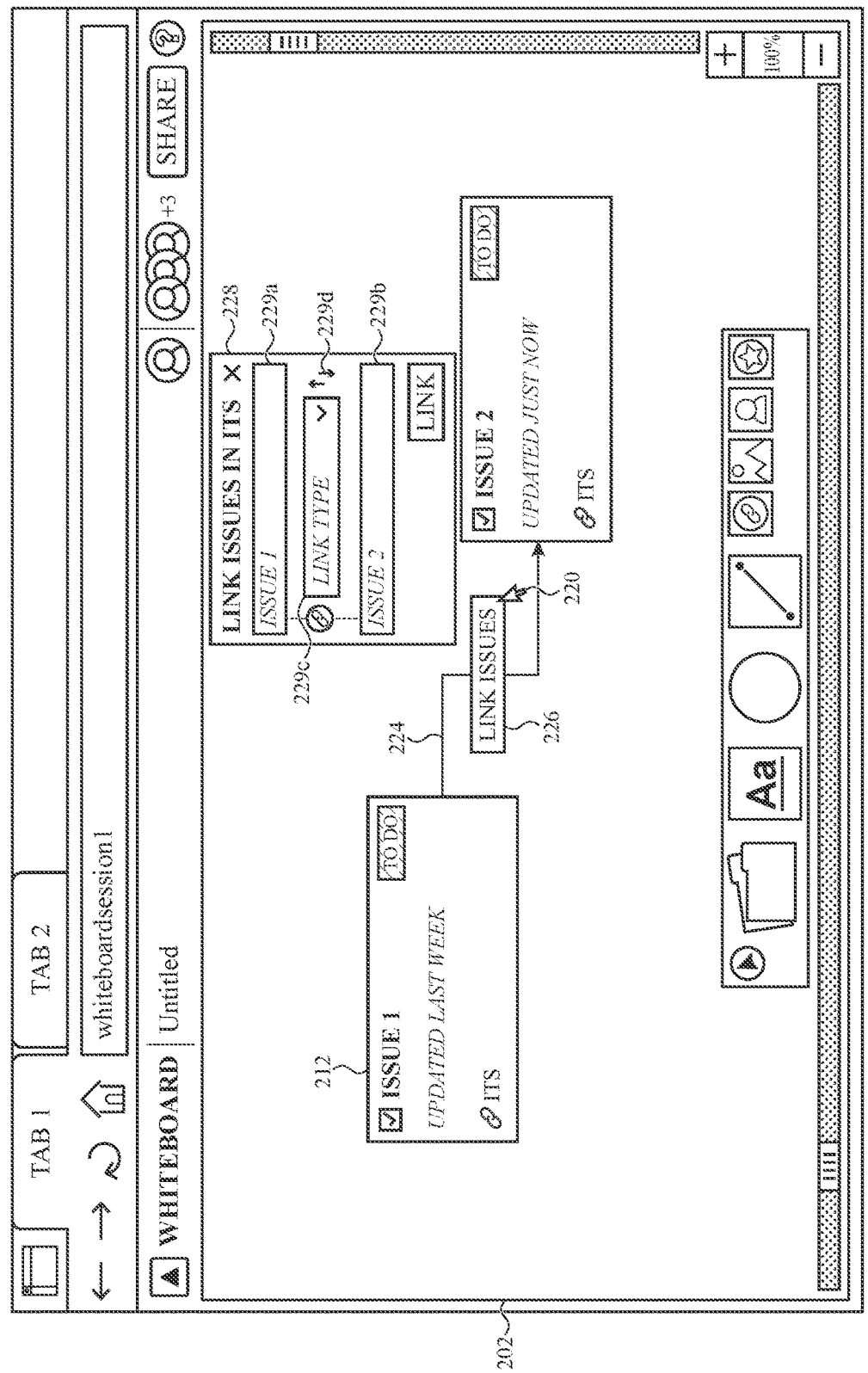

FIG. 2I shows a ninth example view 200i of the graphical user interface of the virtual whiteboarding application. The ninth example view 200i shows the shared editor region 202 including the first issue graphical element 212, the second issue graphical element 218, the cursor 220, the relational wiring graphical element 224, the link confirmation graphical element 226, and a relationship selector graphical element 228. The relationship selector graphical element 228 may be displayed in response to user interaction with the link confirmation graphical element 226, such as, for example, a user clicking the link confirmation graphical element 226. In some embodiments, the relationship selector graphical element 228 may be displayed in response to user interaction indicating a desire to relate the first issue graphical element 212 and the second issue graphical element 218 generally (e.g., a dragging operation between the first issue graphical element 212 and the second issue graphical element 218). The relationship selector graphical element 228 may include a first object identifier 229a, a second object identifier 229*b*, a relationship type specifier graphical element 229*c*, and a reverse direction graphical element 229*d*. The relationship selector graphical element 228 may be configured to allow a user to select a type of relationship between issue graphical objects and thus the issues corresponding thereto (indicated by the first object identifier 229*a* and the second object identifier 229*b*) by interacting with the relationship type specifier graphical element 229*c*, which may be, for example, a drop-down menu. A direction of the relationship may be reversed by interacting with the reverse direction graphical element 229*d*, which may be a button that reverses the direction of the specified relationship type when pressed. In the present example, the relationship selector graphical element 228 may allow a user to select a type of relationship between the first issue graphical element 212 and the second issue graphical element 218, and thus the first issue and the second issue. The types of relationships available for selection may be dictated by the issue tracking system. In some embodiments, the types of relationships available for selection may be retrieved from the issue tracking system, for example, via an API call made to the issue tracking system from the virtual whiteboarding application, which may be initiated on display of the relationship selector graphical element 228 or at another time (and stored by the virtual whiteboarding application, for example, in an integration registry). Further, the types of relationships available for selection may be determined as discussed above. For example, the relationship selector graphical element 228 may allow a user to specify that the first issue blocks the second issue, that the first issue is generally related to the second issue, that the first issue is a duplicate of the second issue, or the like. The relationship selector graphical element 228 may also allow a user to easily reverse the order of the relationship between issues, or delete a relationship between issues if one is not desired. Once a user has selected a relationship type and confirmed, the virtual whiteboarding application may interact with the issue tracking system, for example, via an API of the issue tracking system, to cause the creation of a relationship of the specified type between the first issue and the second issue. Further, the graphical user interface may be updated such that the relationship selector graphical element 228 is hidden and the relational wiring graphical element 224 specifies the type of relationship between the first issue graphical element 212 and the second issue graphical element 218, as shown in FIG. 2J.

Figure 2J:
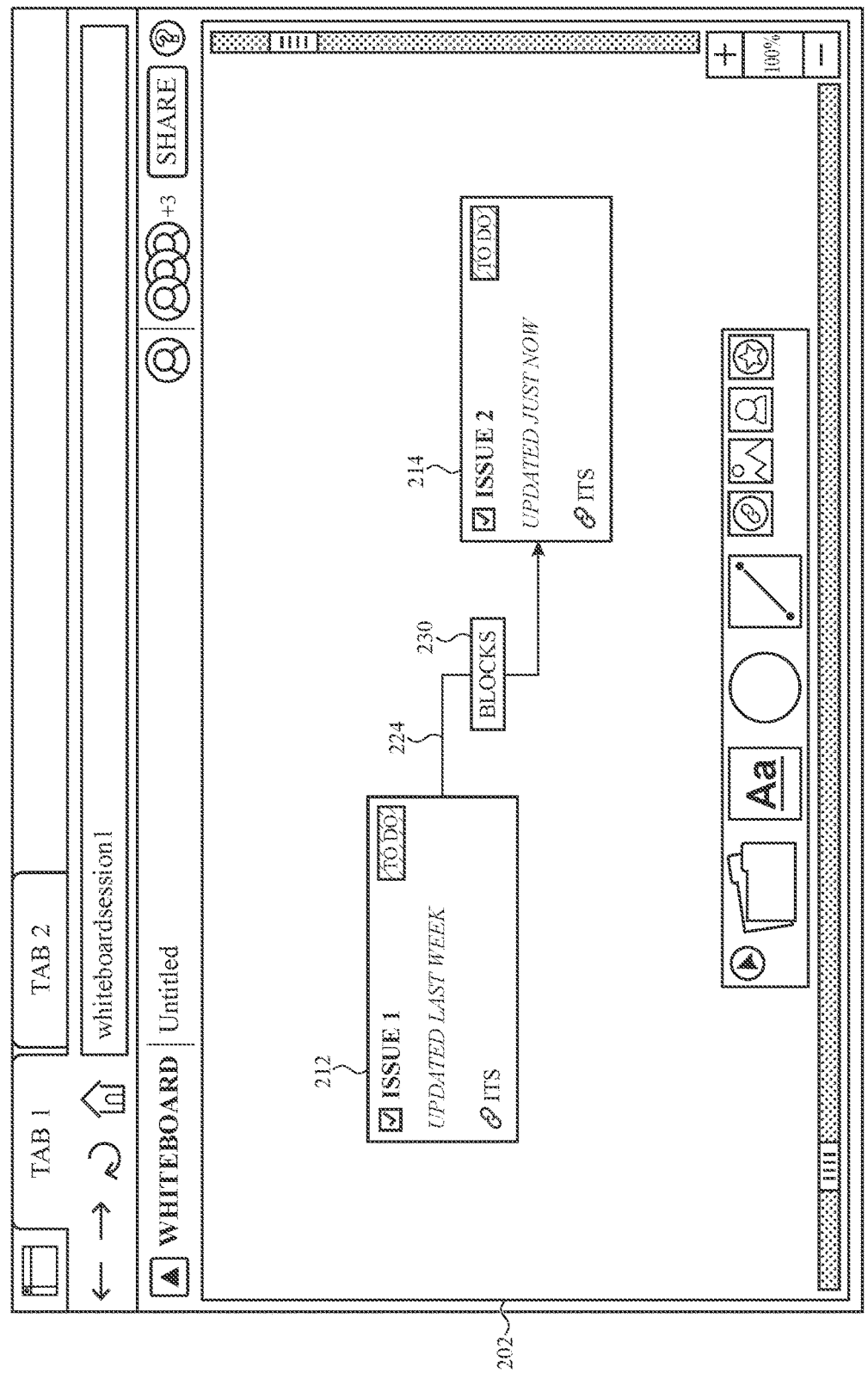

FIG. 2J shows a tenth example view 200*j* of the graphical user interface of the virtual whiteboarding application. The tenth example view shows the shared editor region 202 including the first issue graphical element 212, the second issue graphical element 218, and the relational wiring graphical element 224. As shown, the relational wiring graphical element 224 includes a relationship type indicator graphical element 230 indicating the type of relationship between the first issue graphical element 212 and the second issue graphical element 218. In the example shown, the relationship type indicator graphical element 230 includes text specifying the type of relationship as "blocks," indicating that the first issue graphical element 212 blocks the second issue graphical element 218. Notably, the relationship type indicator graphical element 230 may specify the type of relationship in any suitable way, such as via symbols, colors, or any other way. The relational wiring graphical element 224 may also specify a directionality of the relationship between the first issue graphical element 212 and the second issue graphical element 218, for example, via an arrow as shown, or in any other suitable manner. As discussed above, the first issue graphical element 212 and the second issue graphical element 218 are bidirectionally linked with the first issue and the second issue, respectively, in the issue tracking system, such that changes to the first issue graphical element 212 and the second issue graphical element 218 are reflected in the issue tracking system and vice-versa. Changes to the relationship between the first issue and the second issue in the issue tracking system are also reflected in the virtual whiteboarding application such that the relational wiring graphical element 224 and the relationship type indicator 230 may also be updated in response to changes made in the issue tracking system.

Figure 2K:
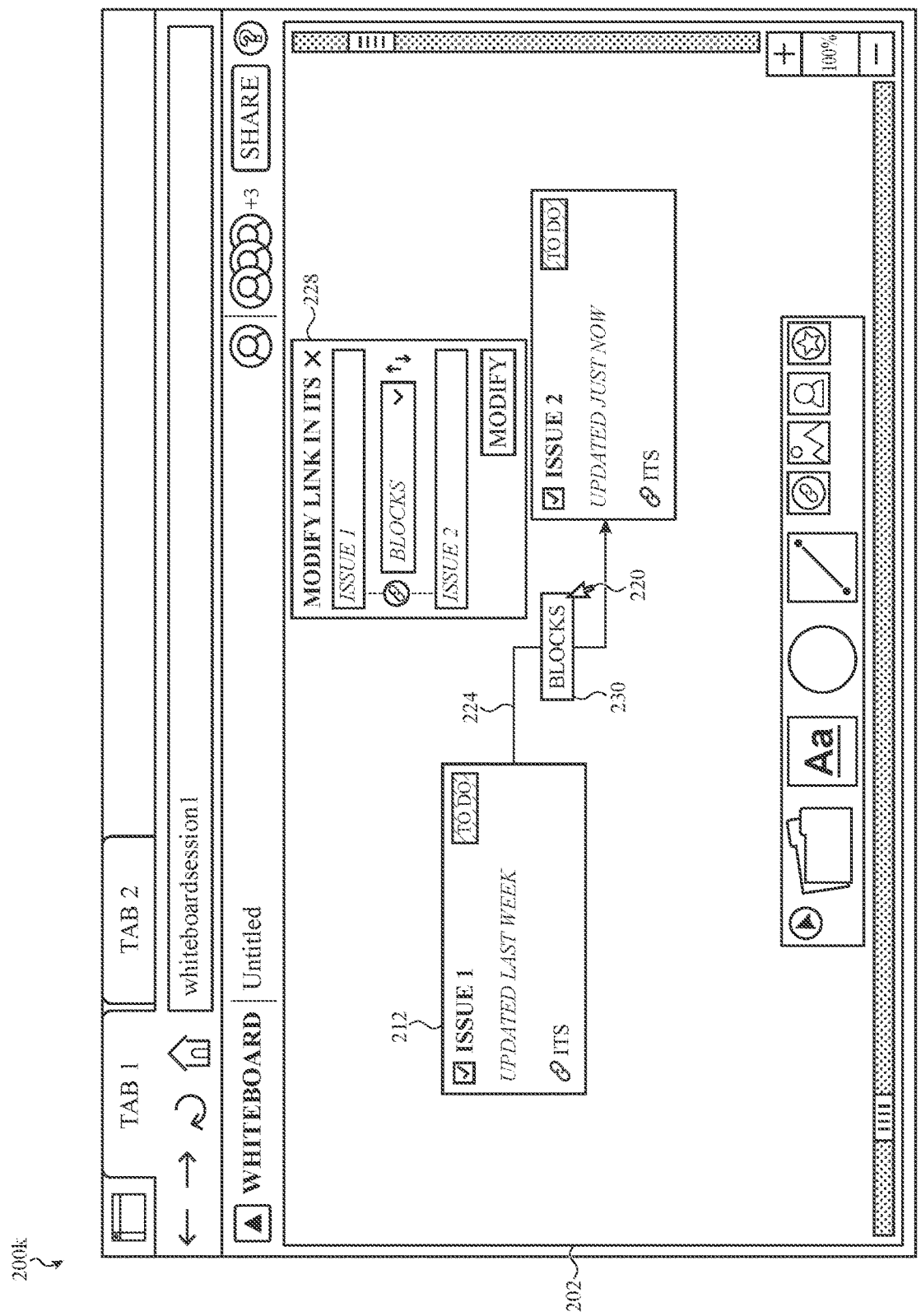

FIG. 2K shows an eleventh example view 200*k* of the graphical user interface of the virtual whiteboarding application. The eleventh example view 200*k* shows the shared editor region 202 including the first issue graphical element 212, the second issue graphical element 218, the cursor 220, the relational wiring graphical element 224, the relationship selector graphical element 228, and the relationship type indicator graphical element 230. The relationship selector graphical element 228 may be displayed in response to user interaction with the relational wiring graphical element 224 and/or the relationship type indicator graphical element 230, such as clicking either graphical element, or by otherwise indicating a desire to modify a relationship between issue graphical elements. The relationship selector graphical element 228 may be modified to indicate that a relationship is being modified rather than created, such as, for example, in a title thereof. The relationship selector graphical element 228 may allow a user to modify the relationship type of the relationship between the first issue graphical element 212 and the second issue graphical element 218, and thus the first issue and the second issue, including deleting an existing relationship. In response to user input modifying the relationship type of the relationship between the first issue graphical element 212 and the second issue graphical element 218, the relational wiring graphical element 224 and the relationship type indicator graphical element 230 may be updated, and the virtual whiteboarding application may interact with the issue tracking system, for example, via an API thereof, to cause the relationship between the first issue and the second issue to be modified.

Notably, the example views and the user journey represented thereby discussed with respect to FIGS. 2A-2K are merely exemplary for purposes of discussion. Any of the example views and user interaction represented thereby may be omitted or modified without departing from the principles of the present disclosure. Any of the operations illustrated in FIGS. 2A-2K may be performed by different users of the virtual whiteboarding application. For example, the first issue graphical element 212 and the second issue graphical element 218 may be imported/created by a first user, the relationship type between the first issue graphical element 212 and the second issue graphical element 218 may be indicated by a second user, and the relationship type between the first issue graphical element and the second issue graphical element 218 may be modified by a third user.

FIGS. 3A-3F depict example views of a graphical user interface of a virtual whiteboarding application executing on a client device of a user. In particular, FIGS. 3A-3F depict example views of the graphical user interface of the virtual whiteboarding application depicting visualizing related issues to a particular issue managed by an issue tracking system corresponding to a graphical element in the graphical user interface.

Figure 3A:
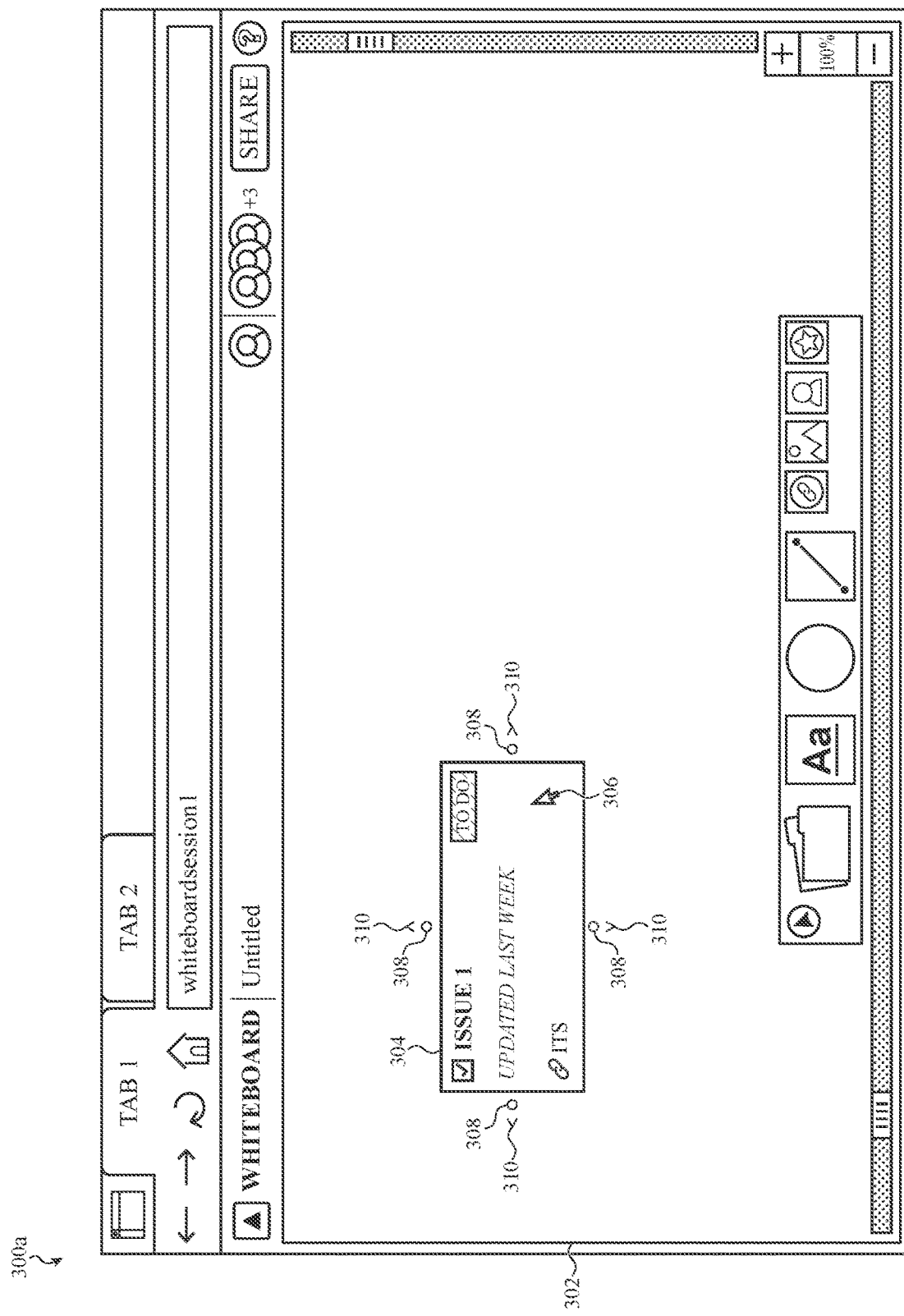
FIGS. 3A-3F depict example views of a virtual whiteboarding application, such as described herein.

FIG. 3A shows a first example view 300*a* of the graphical user interface of the virtual whiteboarding application. The first example view 300a shows a shared editor region 302 including an issue graphical element 304. The issue graphical element 304 may be imported or created as discussed above with respect to FIGS. 2A-2D. The issue graphical element 304 includes data or metadata extracted from an issue in the issue tracking system. The issue graphical element 304 may show all or a portion of the data or metadata. For example, the issue graphical element 304 may show a name of the issue, a status of the issue, an update time of the issue, and a link, which, when selected, may show further information about the issue in the graphical user interface of the virtual whiteboarding application and/or cause information about the issue to be shown in a graphical user interface of the issue tracking system. The issue graphical element 304 may further be associated with additional data extracted from the issue as metadata or otherwise, which may be stored by the virtual whiteboarding application, for example, in a cache or database. The issue graphical element 304 may be selectable and moveable in the shared editor region 302. In some embodiments, selecting the issue graphical element 304 may show additional information about the issue, either within the graphical user interface of the virtual whiteboarding application or within a graphical user interface of the issue tracking system.

The first example view 300a also shows a cursor 306 interacting with the issue graphical element 304. As shown, the cursor 306 is hovering over the issue graphical element 304. This may cause one or more relational wiring control graphical elements 308 and one or more related issue visualization graphical elements 310 to be displayed. While the relational wiring control graphical elements 308 are shown as circles near each edge of the issue graphical element 304 and the related issue visualization graphical elements 310 are shown as arrows, both the relational wiring control graphical elements 308 and the related issue visualization graphical elements 310 may be illustrated in any manner. In some embodiments, the relational wiring control graphical elements 308 and the related issue visualization graphical elements 310 are displayed in response to user interaction (i.e., the cursor 306 hovering over) with a relational wiring graphical region and/or a related issue visualization region of the issue graphical element 304. For example, the relational wiring control graphical elements 308 and/or the related issue visualization graphical elements 310 may be shown in response to the cursor 306 hovering near an edge of the issue graphical element 304, but not near a center of the issue graphical element 304. In other embodiments, the relational wiring control graphical elements 308 and/or the related issue visualization graphical elements 310 are displayed in response to user interaction with any part of the issue graphical element 304.

Figure 3B:
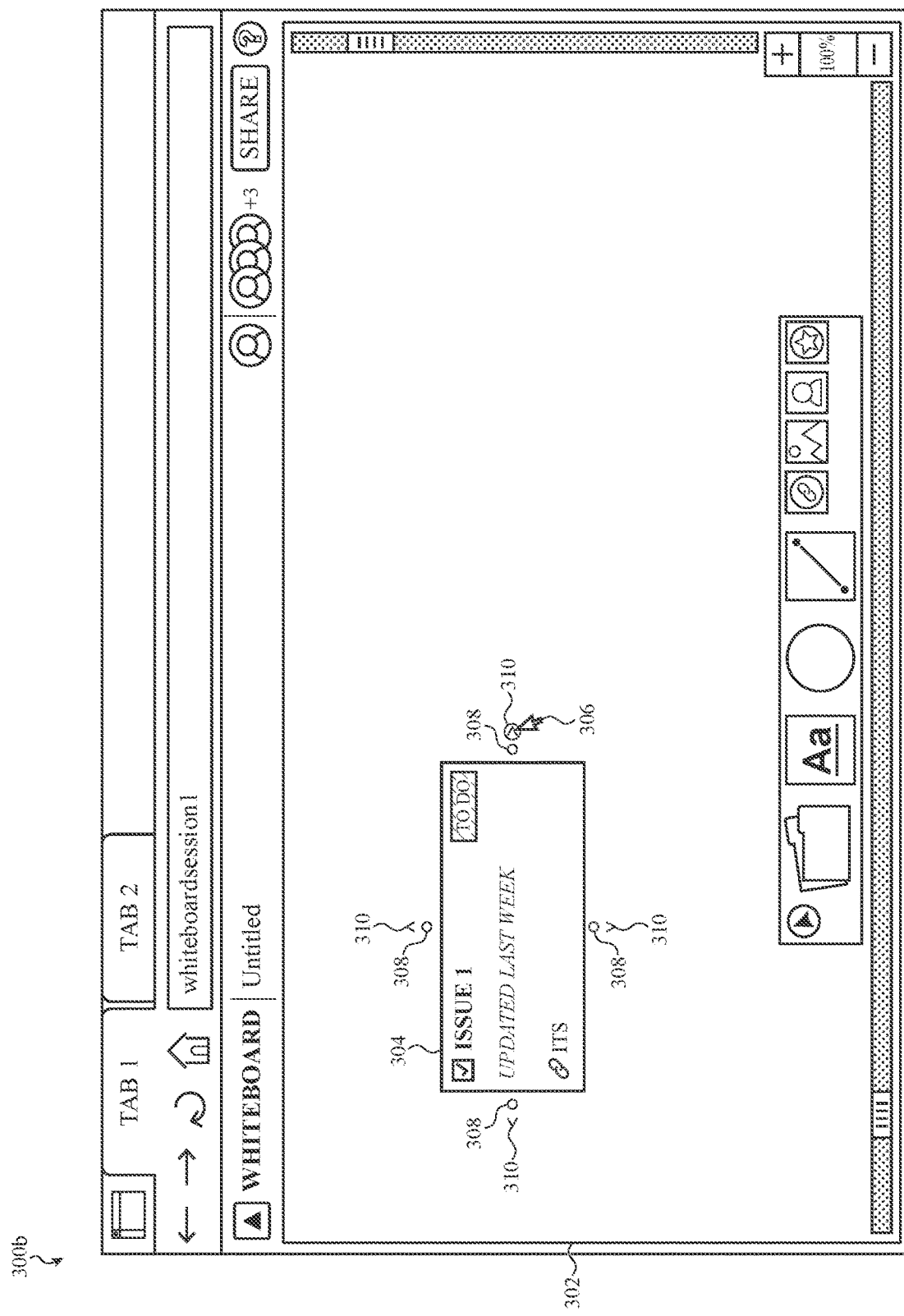
Figure 3C:
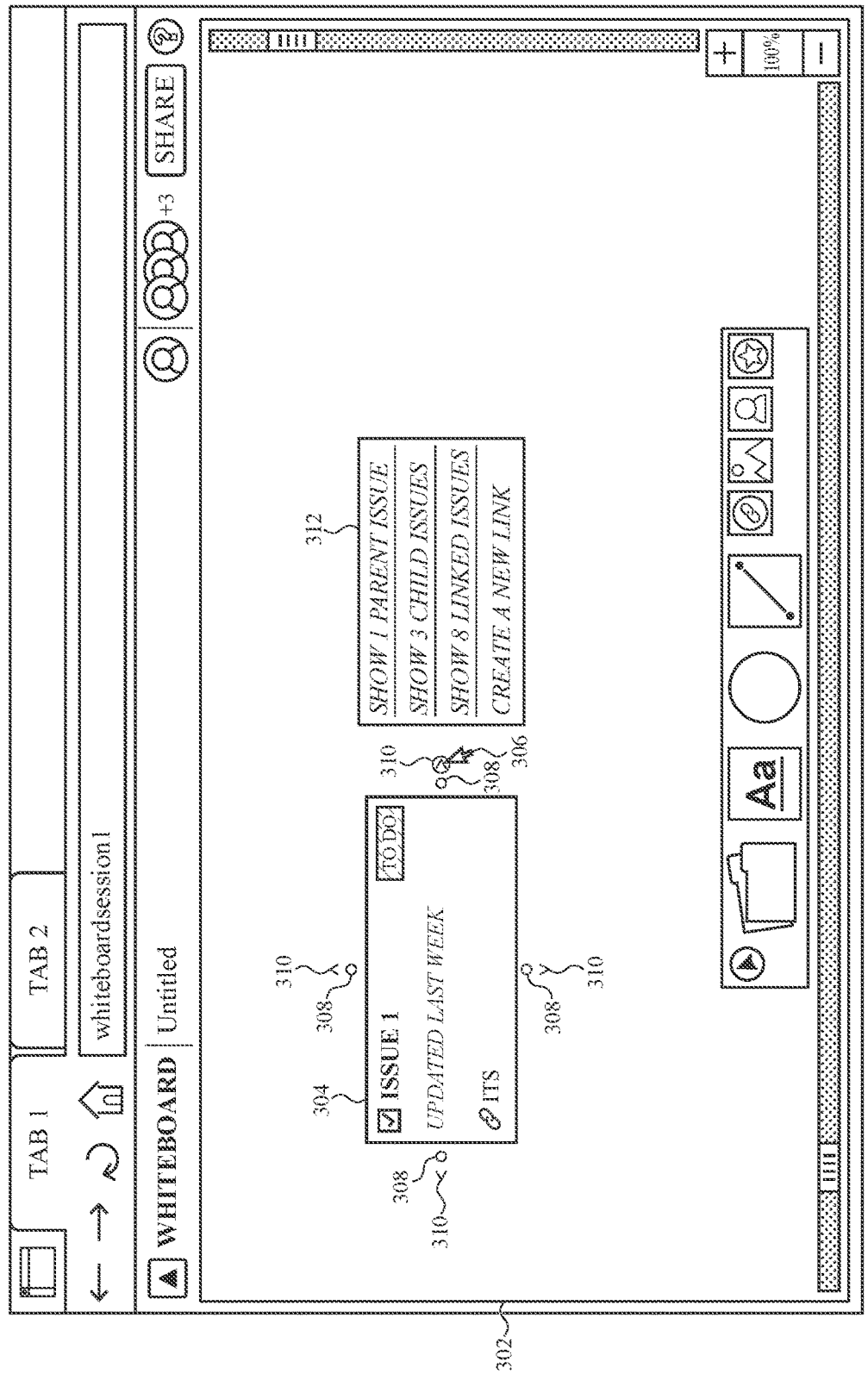

FIG. 3B shows a second example view 300b of the graphical user interface of the virtual whiteboarding application. The second example view 300b shows the shared editor region 302 including the issue graphical element 304. Further, the second example view 300b shows the cursor 306 hovering over one of the related issue visualization graphical elements 310, which may cause the related issue visualization graphical element 310 to change to prompt user interaction therewith. In the example shown, the one of the related issue visualization graphical elements 310 changes to be surrounded by a circle and highlighted. This may prompt a user to click the related issue visualization graphical element 310 to initiate the display of a related issue type selection graphical element as shown in FIG. 3C. In response to a user interacting with one of the related issue visualization graphical elements 310, or at another time, the virtual whiteboarding application may interact with the issue tracking system, for example, via an API of the issue tracking system, to obtain a set of related issues managed by the issue tracking system related to the first issue.

Figure 3D:
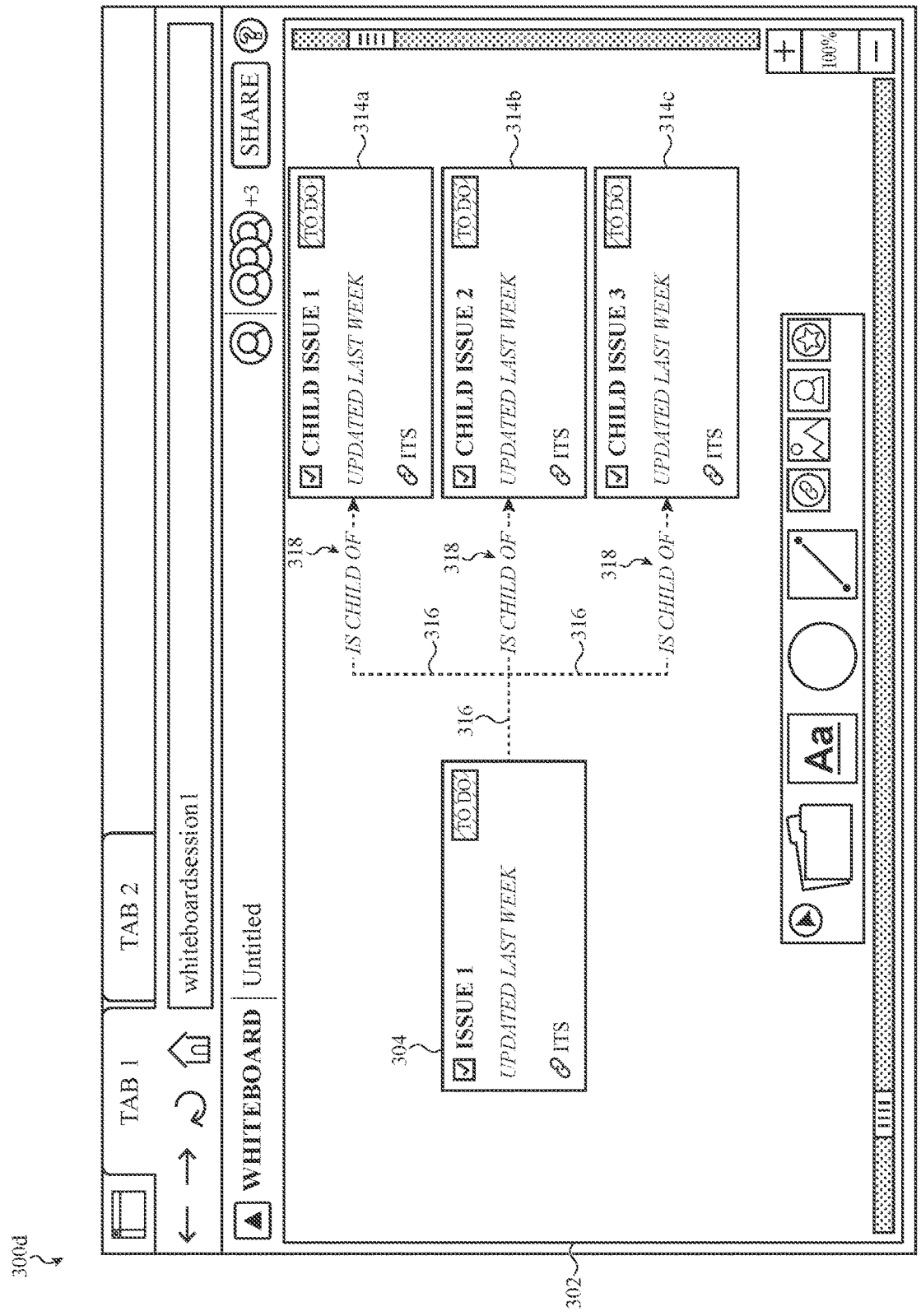

FIG. 3C shows a third example view 300c of the graphical user interface of the virtual whiteboarding application. The third example view 300c shows the shared editor region 302 including the issue graphical element 304, the cursor 306, and a related issue type selection graphical element 312. The related issue type selection graphical element 312 may be displayed in response to user interaction with one of the related issue visualization graphical elements 310, such as a user clicking one of the related issue visualization graphical elements 310. The related issue type selection graphical element 312 may allow a user to select a type of related issues to visualize. The type of issues to visualize may be based on a set of relationship types determined based on the type of relationship between the first issue and each related issue in the issue tracking system. For example, the first issue may have 1 parent issue, 3 child issues, and 8 linked issues. The related issue type selection graphical element 312 may list these available relationship types and allow for selection between them. In response to user interaction with the related issue type selection graphical element 312 specifying a relationship type to visualize, related issue graphical elements may be displayed for each related issue having the specified relationship type, as shown in FIG. 3D. In some embodiments, additional graphical elements or controls may be provided to further refine which related issues are displayed. For example, the related issue type selection graphical element 312 may include a query input configured to accept user input to query related issues, or any other controls for defining which related issues to display.

FIG. 3D shows a fourth example view 300d of the graphical user interface of the virtual whiteboarding application. The fourth example view 300d shows the shared editor region 302 including the issue graphical element 304, a number of related issue graphical elements 314 (individually 314a-314c), and relational wiring graphical elements 316 connected between the issue graphical element 304 and the related issue graphical elements 314. In the present example, a user specified they would like to visualize the 3 child issues related to the issue, and thus a related issue graphical element 314 is displayed for each of the related child issues. The related issue graphical elements 314 are similar to the issue graphical element 304, having data or metadata extracted from the issues they correspond to in the issue tracking system. The same data or metadata as the issue graphical element 304 may be shown in each of the related issue graphical elements 314, but, as discussed above, more data may be associated therewith in the virtual whiteboarding application. The relational wiring graphical elements 316 may indicate the type of relationship between each of the issue graphical element 304 and the related issue graphical elements 314, such as with a relationship type indicator graphical element 318. The relational wiring graphical elements 316 and/or the related issue graphical elements 314 may also indicate that they were generated in response to a command to visualize related issues, such as with dashed lines or otherwise. The related issue graphical elements 314 may be automatically distributed in the shared editor region 302 for easy visualization of their relationship with the issue graphical element 304. The related issue graphical elements 314 may also be selectable and moveable in the shared editor region 302, providing the same functionality as discussed above with respect to the issue graphical element 304. The relational wiring graphical elements 316 and/or the relationship type indicator graphical elements 318 may be selectable to change a relationship type between the issue graphical element 304 and one of the related issue graphical elements 314 as shown in FIG. 3E.

Figure 3E:
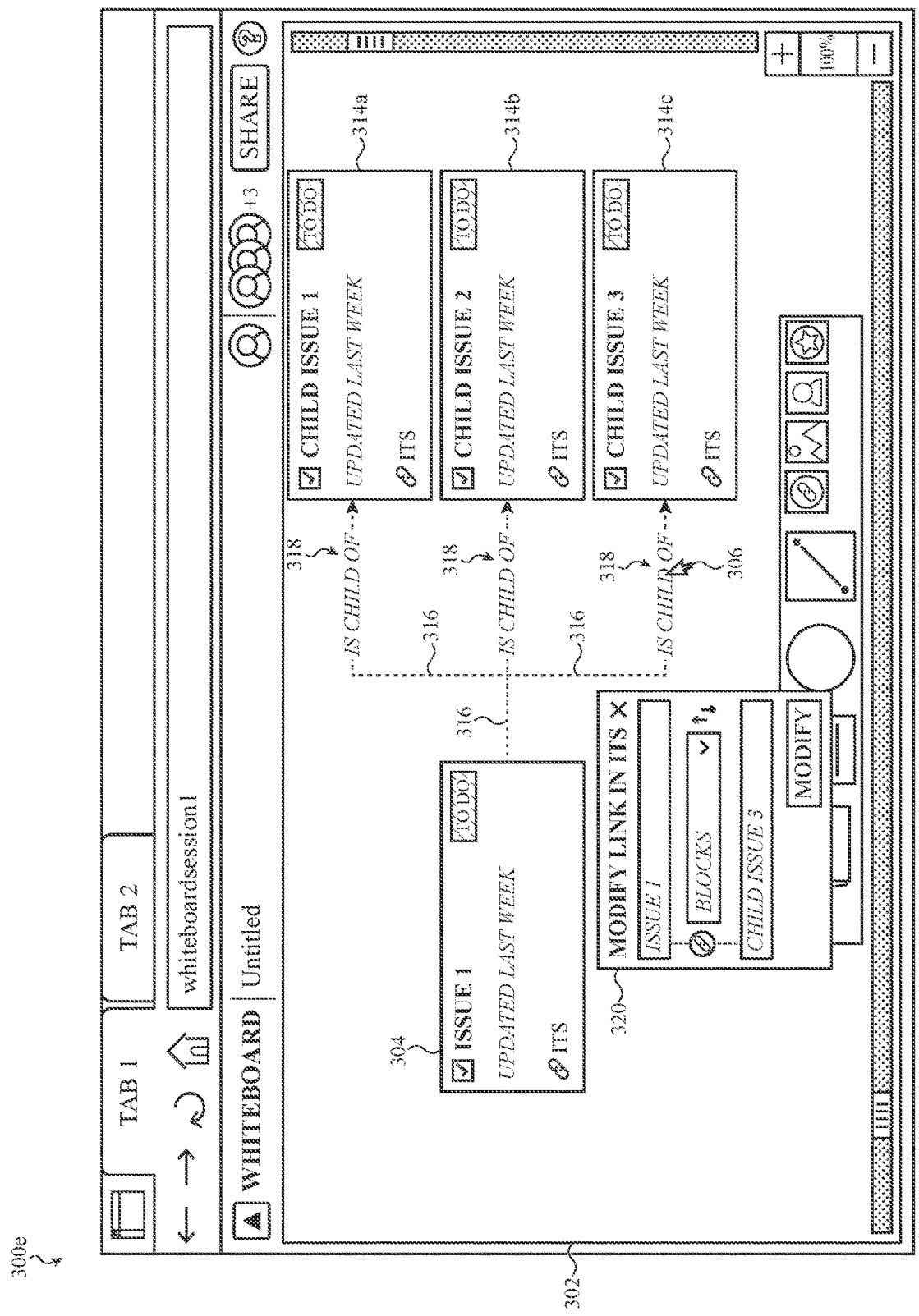

FIG. 3E shows a fifth example view 300e of the graphical user interface of the virtual whiteboarding application. The fifth example view 300e of the graphical user interface shows the shared editor region 302 including the issue graphical element 304, the related issue graphical elements 314, the relational wiring graphical elements 316, the relationship type indicator graphical elements 318, and a relationship selector graphical element 320. The relationship selector graphical element 320 may be displayed in response to user interaction with one of the relational wiring graphical elements 316 and/or the relationship type indicator graphical elements 318, or any other user input indicating a desire to change a relationship between issue graphical elements. As shown, the cursor 306 is positioned over one of the relationship type indicator graphical elements 318 as an example, and the relationship selector graphical element 320 may be displayed in response to a user clicking the indicated relationship type indicator graphical element 318 or a relational wiring graphical element 316. The relationship selector graphical element 320 may be similar to that discussed above with respect to FIG. 2I, allowing a user to update a type of relationship between issues. On selection of an updated relationship type between the issues, the virtual whiteboarding application may interact with the issue tracking system, for example, via an API of the issue tracking system, to cause the relationship between the first issue and the indicated related issue to be modified.

Figure 3F:
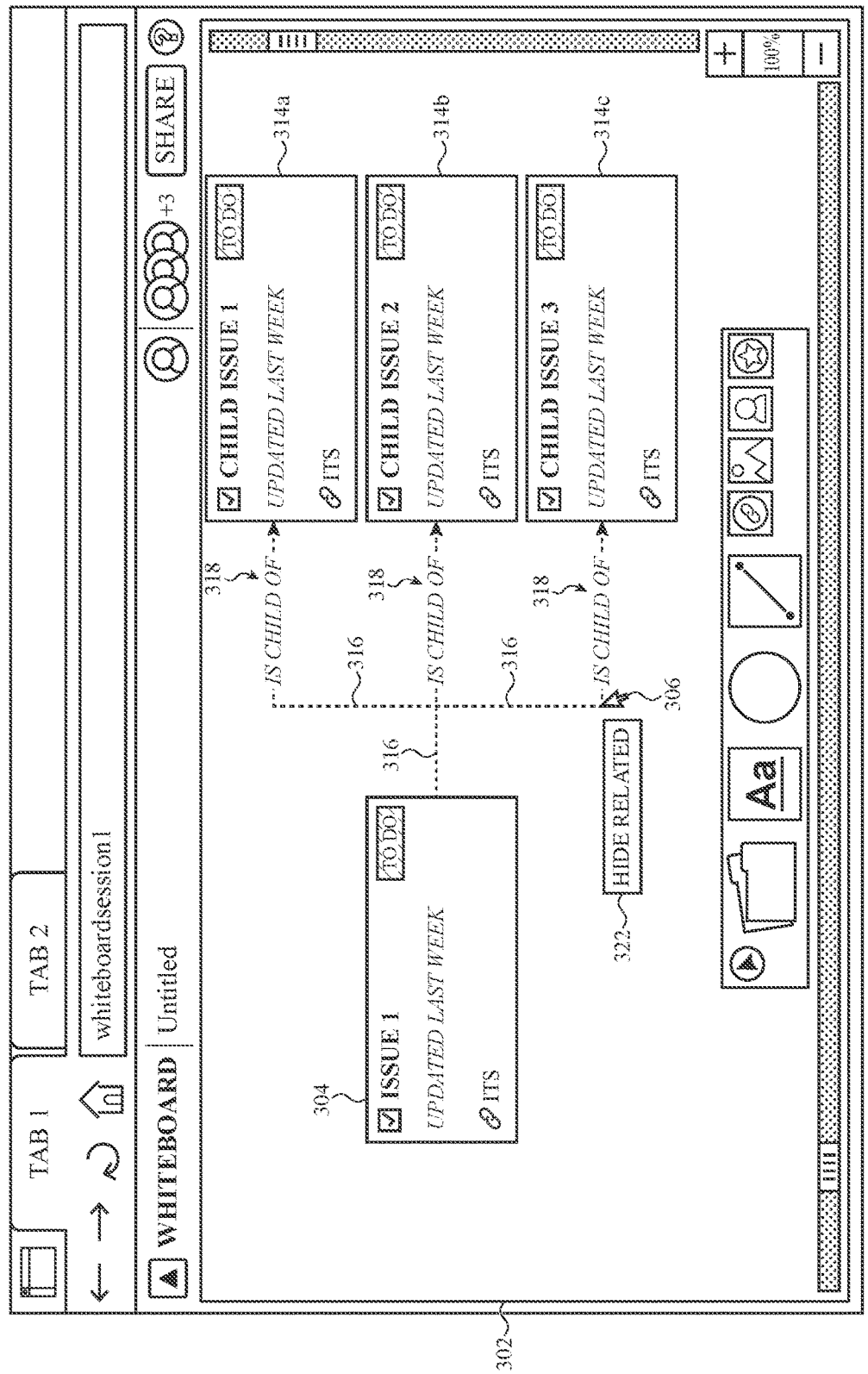

FIG. 3F shows a sixth example view 300f of the graphical user interface of the virtual whiteboarding application. The sixth example view 300f of the graphical user interface shows the shared editor region 302 including the issue graphical element 304, the related issue graphical elements 314, the relational wiring graphical elements 316, the relationship type indicator graphical elements 318, and a hide related issues graphical element 322. The hide related issues graphical element 322 may be displayed in response to user interaction with one of the related issue graphical elements and/or relationship type indicator graphical elements 318. The hide related issues graphical element 322 may allow a user to hide the related issue graphical elements 314 in response to user interaction therewith, such as a click in a designated region. Accordingly, related issue graphical elements 314 can be easily hidden to declutter the shared editor region 302 as desired.

Notably, the example views and the user journey represented thereby discussed with respect to FIGS. 3A-3F are merely exemplary for purposes of discussion. Any of the example views and user interaction represented thereby may be omitted or modified without departing from the principles of the present disclosure.

Figure 4:
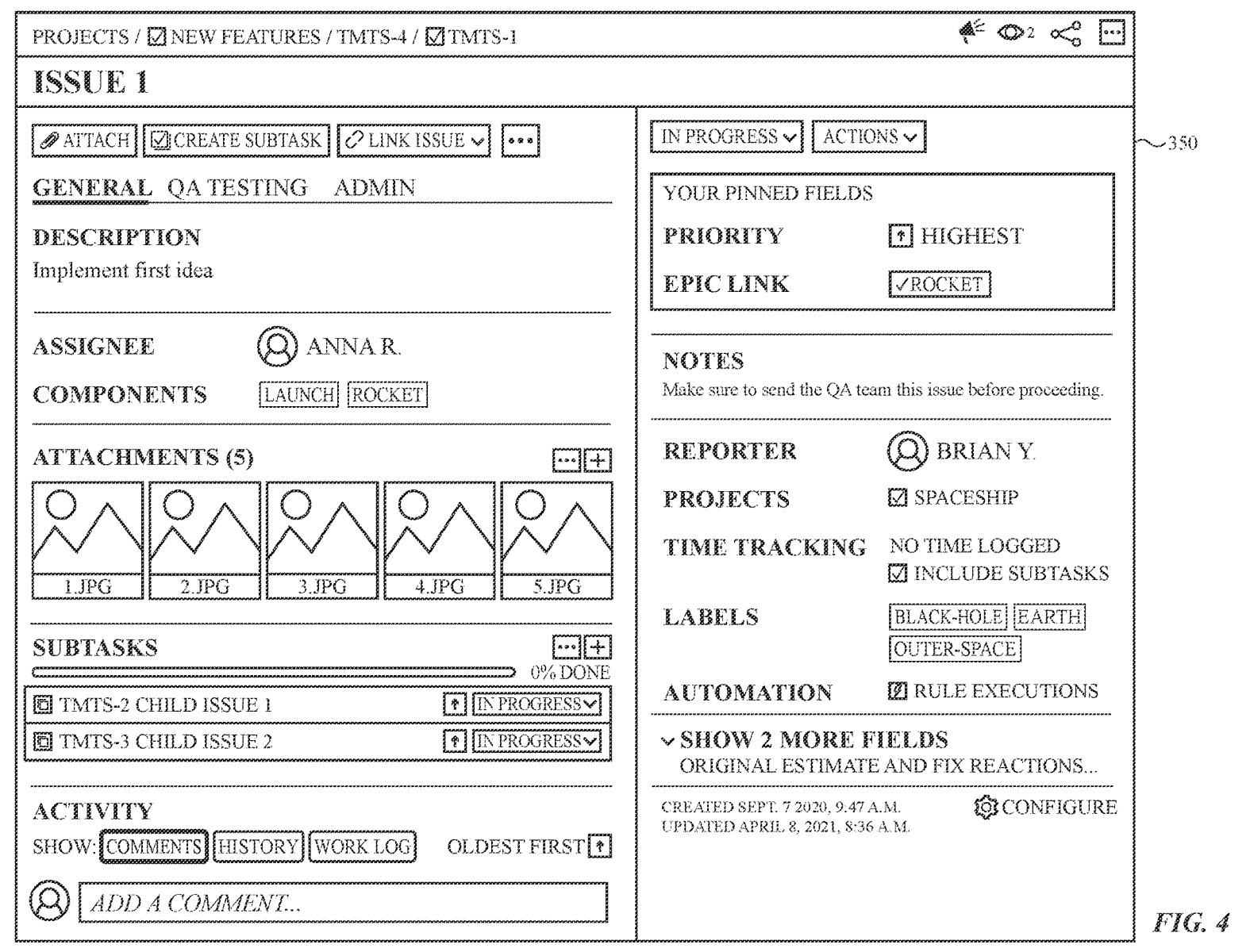

As discussed above, issue graphical elements in the virtual whiteboarding corresponding to issues in the issue tracking system may be selectable to display additional information about the issue in the graphical user interface of the virtual whiteboarding application or in a graphical user interface of the issue tracking system. FIG. 4 depicts an example graphical user interface 350 of an issue tracking system. Specifically, the graphical user interface 350 depicts issue object data associated with an issue managed and tracked by a corresponding issue tracking system or platform. As described previously, the graphical user interface 350 may be displayed in response to a user selection of one of the issue graphical elements described herein. The graphical user interface 350 may be provided by a frontend or client of an issue tracking platform executing or operating on a client device. The graphical user interface 350 may include various issue or object data that is associated with the respective issue. As described previously, some of this issue data may be used to generate the issue graphical elements in the virtual whiteboarding application. Changes to the issue data occurring due to input received at the graphical user interface 350 or otherwise implemented by the issue tracking system will automatically be updated when the issue graphical element is loaded or refreshed. The graphical user interface 350 depicts the issue on a single screen, however, the issue data may be displayed using a series of tabs or links available through the graphical user interface 350.

As shown in FIG. 4, the issue data includes text stored as fields or elements of the issue object. Issue fields include, for example, issue title, issue description, notes, and comments. Other issue data may include attachments or non-text content that is associated or stored with the issue object. Example non-text content includes screenshots, diagrams, and other graphical content that may be stored as image or other media files. Other example attachment content includes source code files, test results, user logs, and other similar content. The issue data may also include references or links to other system objects including, for example, projects or epics, which may have a parent-child relationship with the particular issue. Similarly, the issue data may include references or links to other issues identified as subtasks of the issue and may have a child-parent relationship with the particular issue. The issue data may also include references or pointers to other system elements like a system user or user profile identified as an assignee, owner, reviewer, or other role associated with the issue object.

While the foregoing discussion is directed to issue graphical elements in the virtual whiteboarding application corresponding to issues managed by the issue tracking system, the same principles apply to objects managed by any third-party system. For example, the same principles apply to content items managed by a content management system, mockup items managed by a user interface design system, or any other objects managed by any other third-party system. The virtual whiteboarding application may operate as described above to generate graphical elements corresponding to an object managed by a third-party system, accept user input for moving or modifying the graphical elements and thus the objects corresponding thereto, determine if graphical elements (and the objects corresponding thereto) can be related, relate graphical elements and thus the objects corresponding thereto (which may result in actions and functional links in the third-party systems as discussed above), and visualize relationships between objects.

Figure 5:
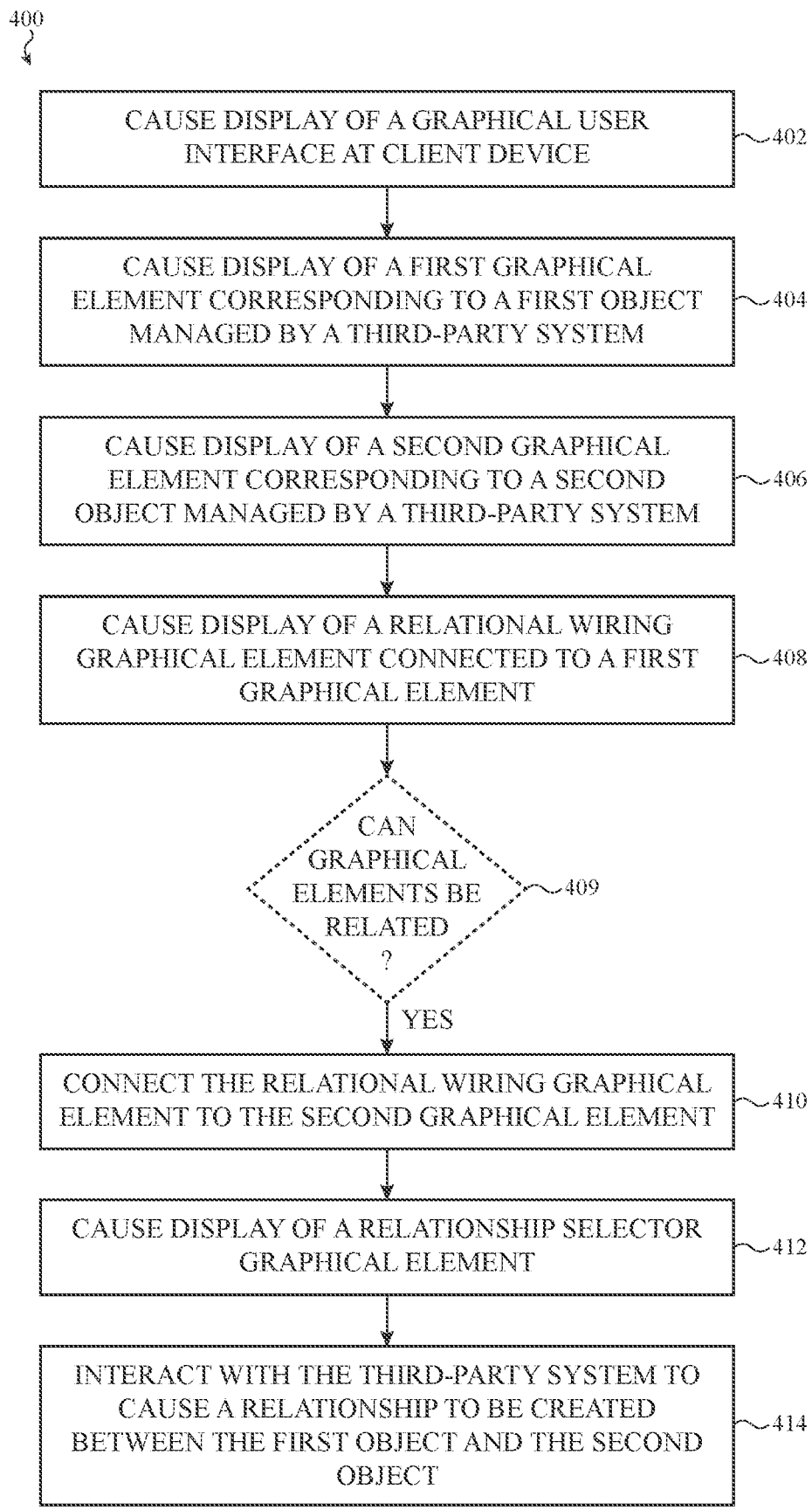
FIG. 5 depicts a flow chart of an example method for visualizing and organizing issues managed by an issue tracking system in a virtual whiteboarding application, such as described herein.

FIG. 5 shows a flow chart of an example method 400 for organizing objects managed by one or more third-party systems in a virtual whiteboarding application according to one embodiment of the present disclosure. At operation 402, a graphical user interface of the virtual whiteboarding application is displayed at a client device. The graphical user interface may include a shared editor region configured to generate graphical elements in response to input received from one or more users. In some embodiments, the shared editor region may be configured to generate graphical elements in response to concurrent inputs received from multiple users to provide a collaborative whiteboarding session. The graphical user interface of the virtual whiteboarding application may be displayed at multiple client devices simultaneously, such as at the client device of each user of a set of users participating in a whiteboarding session. The graphical elements may include user-generated content such as text, images, screenshots, drawings, media, or any other data generated or provided by one or more users of the virtual whiteboarding application. The graphical elements may be contemporaneously created and modified by users participating in a whiteboarding session in the virtual whiteboarding application. The graphical user interface may be caused to be displayed at the client device by instantiating a client application, or a virtual whiteboarding frontend application, at the client device.

At operation 404, a first graphical element is displayed in the shared editor region. The first graphical element may correspond to a first object managed by a third-party system (e.g., an issue in an issue tracking system, a content item in a content management system, or the like). For example, the first graphical element may be a first issue graphical element corresponding to a first issue managed by an issue tracking system. Accordingly, the first issue graphical element may include data or metadata extracted from the first issue. The first issue graphical element may display some or all of the extracted data or metadata. The first issue graphical element may be bidirectionally linked with the first issue such that changes to the first issue in the issue tracking system are reflected in the first issue graphical element and vice-versa.

In some embodiments, displaying the first graphical element is in response to user input. In particular, user input indicating a desire to import an object from the third-party system as a graphical element may cause an object creation interface to be displayed as illustrated above with respect to FIG. 2A. User interaction with the object creation interface may cause the first graphical element to be generated and/or displayed.

At operation 406, a second graphical element is displayed in the shared editor region. The second graphical element may correspond to a second object managed by a third-party system, which may be the same third-party system discussed above with respect to operation 404 or a different third-party system. For example, the second graphical element may be a second issue graphical element corresponding to a second issue managed by the issue tracking system. Accordingly, the second issue graphical element may include data or metadata extracted from the second issue. The second issue graphical element may display some or all of the extracted data or metadata. The second issue graphical element may be bidirectionally linked with the second issue such that changes to the second issue in the issue tracking system are reflected in the second issue graphical element and vice-versa.

In some embodiments, displaying the second graphical element is in response to user input. In particular, user input indicating a desire to create a new object in the third-party system may cause an object creation interface to be displayed as illustrated above with respect to FIG. 2C. User interaction with the object creation interface may cause the virtual whiteboarding application to interact with the third-party system, for example, via an API of the third-party system, to create the second object and cause the second graphical element to be generated and/or displayed.

At operation 408, a relational wiring graphical element connected to the first graphical element is displayed as illustrated above in FIG. 2G. The relational wiring graphical element may be displayed in response to user input provided to the first graphical element, or a graphical element of the first graphical element such as a relational wiring control graphical element as illustrated above with respect to FIGS. 2E-2F. The relational wiring graphical element may be displayed in response to a user clicking the first graphical element or a graphical element thereof. The relational wiring graphical element may be connected between the first graphical element and a cursor in the shared editor region, following the cursor until dismissed or connected to another graphical element.

At operation 409, which is optional, a determination is made whether the first graphical element can be related to the second graphical element. This may be in response to user input indicating a desire to relate the first graphical element and the second graphical element, such as a drag operation initiated at or near the first graphical element and ending at or near the second graphical element. As discussed above, the determination whether the first graphical element can be related to the second graphical element may include referencing an integration registry of the virtual whiteboarding application, which specifies which types of graphical objects and/or corresponding objects in third-party systems can be related. For example, the virtual whiteboarding application may reference the integration registry to determine if two issue graphical elements can be related, whether an issue graphical element and a content item graphical element can be related, or generally whether graphical elements and the objects managed by third-party systems corresponding thereto can be related. Additionally or alternatively, the determination may also involve interacting with one or more third-party systems, for example, via one or more API calls, to determine whether the objects corresponding to the graphical elements can be related. For example, the virtual whiteboarding application may interact with the issue tracking system to determine if the first issue can be related to the second issue. If the graphical elements and/or the corresponding objects thereto cannot be related, an indication may be provided to a user, such as a dialog indicating the same. As part of the determination in operation 409 or separately, a subset of relationships available between graphical elements may be determined as discussed above.

At operation 410, the relational wiring graphical element is connected to the second graphical element as illustrated above in FIG. 2H. This may be in response to user input provided at or near the second graphical element. In one embodiment, the relational wiring graphical element is connected between the first graphical element and the second graphical element in response to a drag operation initiated at or near the first graphical element and ending at or near the second graphical element.

At operation 412, a relationship selector graphical element is displayed as illustrated above in FIG. 2I. The relationship selector graphical element may be displayed in response to user input provided to the relational wiring graphical element, to a link confirmation graphical element displayed when the relational wiring graphical element is connected to the second graphical element as illustrated above in FIG. 2H, or any user input indicating a desire to relate two graphical elements. The relationship selector graphical element may be configured to allow a user to select a relationship type between the first graphical element and the second graphical element, and thus, the first object and the second object.

At operation 414, the virtual whiteboarding application interacts with the third-party system to cause the third-party system to create a relationship between the first object and the second object. In embodiments wherein the first object is managed by a first third-party system and the second object is managed by a second third-party system, the virtual whiteboarding application may interact with one of the first third-party system and the second third-party system or both of the first third-party system and the second third-party system to create a relationship between the first object and the second object. The interaction may be in response to user input provided to the relationship selector graphical element selecting a relationship type. The virtual whiteboarding application may interact with the third-party system via an API of the third-party system, such that the virtual whiteboarding application creates an API request for creating a relationship between the first object and the second object and sends the API request to the third-party system. In addition, the virtual whiteboarding system may cause the relational wiring graphical element to be updated to indicate the type of relationship between the first graphical element and the second graphical element as illustrated above in FIG. 2J. Following the example discussed above, the virtual whiteboarding application may interact with the issue tracking system, for example, via an API of the issue tracking system, to create a relationship between the first issue and the second issue.

Figure 6:
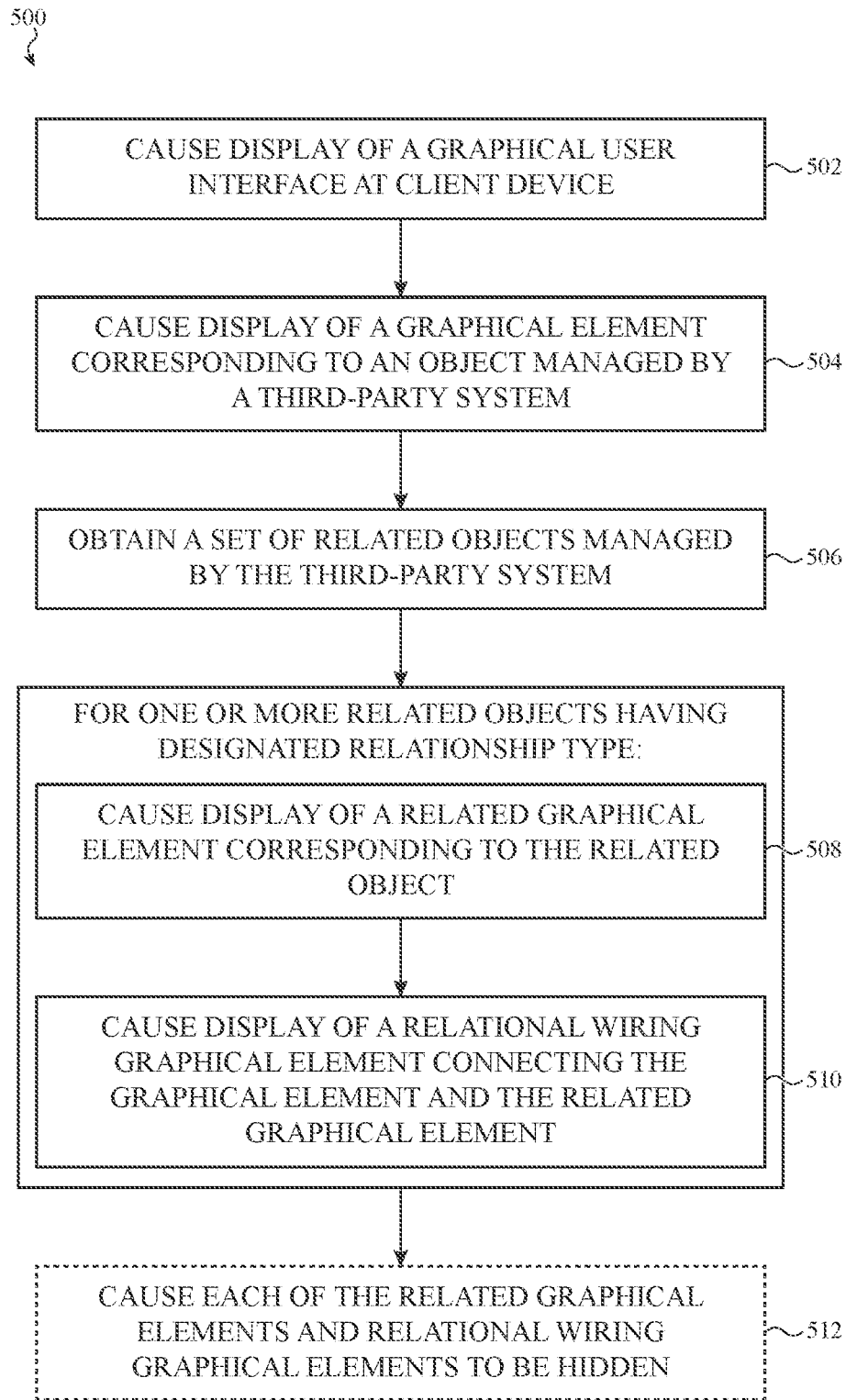
FIG. 6 depicts a flow chart of an example method for visualizing and organizing issues managed by an issue tracking system in a virtual whiteboarding application, such as described herein.

FIG. 6 shows a flow chart of an example method 500 for visualizing objects managed by a third-party system in a virtual whiteboarding application according to one embodiment of the present disclosure. At operation 502, a graphical user interface of the virtual whiteboarding application is displayed at a client device. The graphical user interface may include a shared editor region configured to generate graphical elements in response to input received from one or more users. In some embodiments, the shared editor region may be configured to generate graphical elements in response to concurrent inputs received from multiple users to provide a collaborative whiteboarding session. The graphical user interface of the virtual whiteboarding application may be displayed at multiple client devices simultaneously, such as at a client device of each user of a set of users participating in a whiteboarding session. The graphical elements may include user-generated content such as text, images, screenshots, drawings, media, or any other data generated or provided by one or more users of the virtual whiteboarding application. The graphical user interface may be caused to be displayed at the client device by instantiating a client application, or a virtual whiteboarding frontend application, at the client device.

At operation 504, a graphical element is displayed in the shared editor region. The graphical element may correspond to an object managed by a third-party system (e.g., an issue in an issue tracking system, a content item in a content management system, or the like). For example, the graphical element may correspond to an issue managed by an issue tracking system. Accordingly, the issue graphical element may include data or metadata extracted from the issue. The issue graphical element may display some or all of the extracted data or metadata. The issue graphical element may be bidirectionally linked with the issue such that changes to the issue in the issue tracking system are reflected in the issue graphical element and vice-versa.

In some embodiments, displaying the graphical element is in response to user input. In particular, user input indicating a desire to import an object from the third-party system as a graphical element may cause an object creation interface to be displayed as illustrated above with respect to FIG. 2A. User interaction with the object creation interface may cause the graphical element to be generated and/or displayed. Alternatively, user input indicating a desire to create a new object in the third-party system may cause an object creation interface to be displayed as illustrated above with respect to FIG. 2C. User interaction with the object creation interface may cause the virtual whiteboarding application to interact with the third-party system, for example, via an API of the third-party system, to create the object and cause the graphical element to be generated and/or displayed.

At operation 506, a set of related objects to the object are obtained from the third-party system. The set of related objects may be obtained in response to user input. For example, the set of related objects may be in response to user input indicating a type of related objects to visualize in the shared editor region as illustrated above with respect to FIGS. 3A-3C. Obtaining the set of related objects may be accomplished by interacting with the third-party system via an API of the third-party system. For example, the virtual whiteboarding application may generate an API request asking for objects related to the object and, in response, receive the set of related objects. Following the example above, the virtual whiteboarding application may interact with the issue tracking system, for example, via an API thereof, to obtain a set of related issues to the issue.

Operations 508 and 510 may occur for one or more of the set of related objects having a designated relationship type. The designated relationship type may be provided by user input, for example, to a related object type selection graphical element as illustrated in FIG. 3C. At operation 508, a related graphical element corresponding to a related object type selection graphical element is displayed. As discussed above, the related graphical element may include data or metadata extracted from the related object type selection graphical element, and may display some or all of the extracted data or metadata. At operation 510, a relational wiring graphical element is displayed. The relational wiring graphical element may be displayed between the graphical element and the related graphical element. Display of relational wiring graphical elements and related graphical elements as in operations 508 and 510 is illustrated in FIG. 3D. In some embodiments, the type of relationship between each related graphical element and the graphical element is indicated by the relational wiring graphical elements or otherwise.

At optional operation 512, each of the related graphical elements and the relational wiring graphical elements are hidden. The related graphical elements and relational wiring graphical elements may be hidden in response to user input, such as user interaction with a relational wiring graphical element or a hide related object graphical element displayed in response to user interaction with a relational wiring graphical element, as illustrated in FIG. 3F. Accordingly, the shared editor region can be decluttered quickly.

Figure 7:
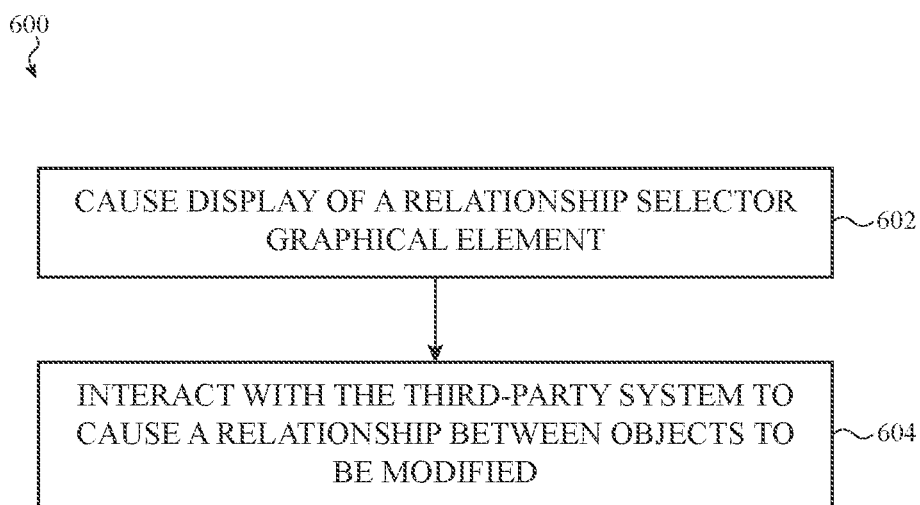
FIG. 7 depicts a flow chart of an example method for visualizing and organizing issues managed by an issue tracking system in a virtual whiteboarding application, such as described herein.

FIG. 7 shows a flow chart of an example method 600 for organizing objects managed by a third-party system in a virtual whiteboarding application according to one embodiment of the present disclosure. At operation 602, a relationship selector graphical element is displayed as illustrated above in FIG. 2K and FIG. 3E. The relationship selector graphical element may be displayed in response to user input, such as in response to user interaction with a relational wiring graphical element or a relationship type indicator graphical element between two graphical elements in the shared editor region. In general, the relationship selector graphical element may be displayed in response to user input indicating a desire to modify a relationship between graphical elements in the shared editor region.

At operation 604, the virtual whiteboarding application interacts with the third-party system to cause a relationship between objects to be updated. The virtual whiteboarding application may interact with the third-party system to update a relationship between objects in response to user input, such as user input indicating an updated relationship type between objects provided to the relationship selector graphical element. As discussed above, the virtual whiteboarding application may interact with the third-party system via an API of the third-party system. Operations 602 and 604 may occur after the establishment of a relationship between graphical elements as discussed above with respect to FIG. 5, or between a related graphical element and graphical element after visualization as discussed above with respect to FIG. 6. In general, the virtual whiteboarding application may allow for modifying a relationship between two graphical elements and/or a graphical element and a related graphical element, which, in turn, causes the relationship between the corresponding objects managed by the third-party system to be updated. Following the example above, the graphical elements may be issue graphical elements and the virtual whiteboarding application may interact with the issue tracking system, for example, via an API thereof, to update a relationship between the issues corresponding to the issue graphical elements. As another example, the graphical elements may include an issue graphical element and a related issue graphical element, and the virtual whiteboarding application may similarly interact with the issue tracking system to update the relationship between the issues corresponding thereto.

Figure 8:
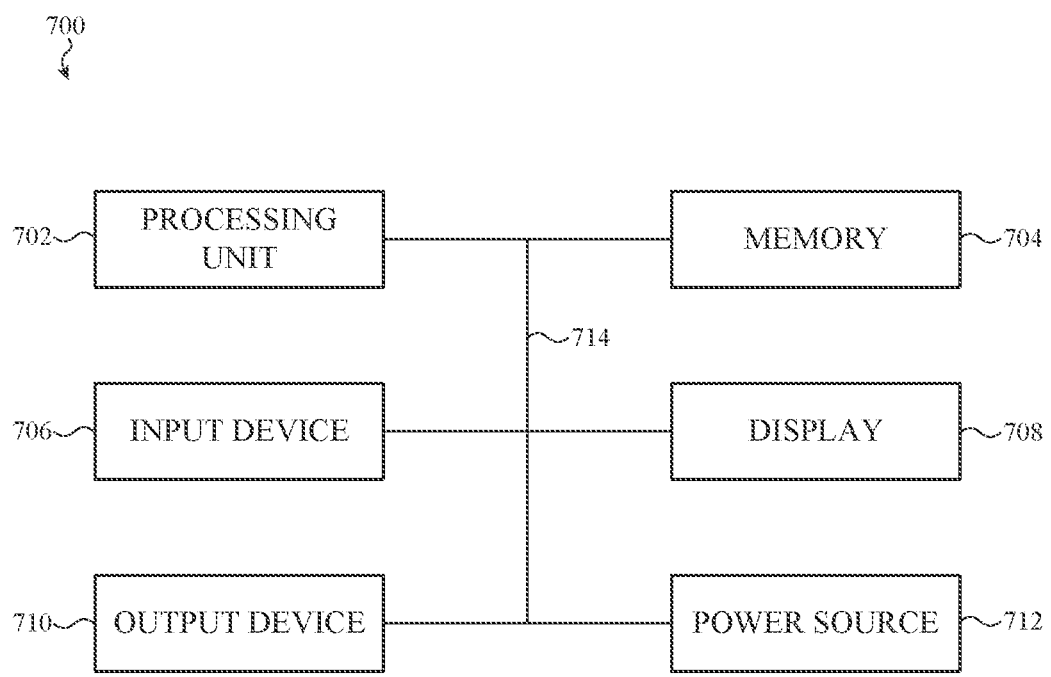
FIG. 8 depicts a block diagram of example hardware for providing the functionality described herein.

FIG. 8 shows a sample electrical block diagram of an electronic device 700 that may perform the operations described herein. The electronic device 700 may in some cases take the form of any of the electronic devices described with reference to FIGS. 1, 2A-2K, and 3A-3F, including client devices, and/or servers or other computing devices associated with the content collaboration system 100. The electronic device 700 can include one or more of a processing unit 702, a memory 704 or storage device, input devices 706, a display 708, output devices 710, and a power source 712. In some cases, various implementations of the electronic device 700 may lack some or all of these components and/or include additional or alternative components.

The processing unit 702 can control some or all of the operations of the electronic device 700. The processing unit 702 can communicate, either directly or indirectly, with some or all of the components of the electronic device 700. For example, a system bus or other communication mechanism 714 can provide communication between the processing unit 702, the power source 712, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit and other components of the electronic device 700 (e.g., the display 708) may be controlled by a second processing unit, where the first and second processing units may or may not be in communication with each other.

The power source 712 can be implemented with any device capable of providing energy to the electronic device 700. For example, the power source 712 may be one or more batteries or rechargeable batteries. Additionally, or alternatively, the power source 712 can be a power connector or power cord that connects the electronic device 700 to another power source, such as a wall outlet.

The memory 704 can store electronic data that can be used by the electronic device 700. For example, the memory 704 can store electronic data or content such as, for example, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 708 provides a graphical output, for example associated with an operating system, user interface, and/or applications of the electronic device 700 (e.g., a chat user interface, an issue-tracking user interface, an issue-discovery user interface, etc.). In one embodiment, the display 708 includes one or more sensors and is configured as a touch-sensitive (e.g., single-touch, multi-touch) and/or force-sensitive display to receive inputs from a user. For example, the display 708 may be integrated with a touch sensor (e.g., a capacitive touch sensor) and/or a force sensor to provide a touch- and/or force-sensitive display. The display 708 is operably coupled to the processing unit 702 of the electronic device 700.

The display 708 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 708 is positioned beneath and viewable through a cover that forms at least a portion of an enclosure of the electronic device 700.

In various embodiments, the input devices 706 may include any suitable components for detecting inputs. Examples of input devices 706 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more particular types of input and provide a signal (e.g., an input signal) corresponding to the detected input. The signal may be provided, for example, to the processing unit 702.

As discussed above, in some cases, the input device(s) 706 include a touch sensor (e.g., a capacitive touch sensor) integrated with the display 708 to provide a touch-sensitive display. Similarly, in some cases, the input device(s) 706 include a force sensor (e.g., a capacitive force sensor) integrated with the display 708 to provide a force-sensitive display.

The output devices 710 may include any suitable components for providing outputs. Examples of output devices 710 include light emitters, audio output devices (e.g., speakers), visual output devices (e.g., lights or displays), tactile output devices (e.g., haptic output devices), communication devices (e.g., wired, or wireless communication devices), and so on, or some combination thereof. Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710, to provide and/or change outputs as appropriate.

These foregoing embodiments depicted in FIGS. 1-8 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

What is claimed is:

1. A computer-implemented method of organizing issues in a virtual whiteboarding application, the computer-implemented method comprising:

causing display of a graphical user interface of the virtual whiteboarding application at a client device, the graphical user interface including a shared editor region configured to generate graphical elements in response to input received from one or more users;

causing display of a first issue graphical element in the shared editor region, the first issue graphical element being a selectable graphical element having metadata extracted from a first issue managed by an issue tracking system;

causing display of a second issue graphical element in the shared editor region, the second issue graphical element being a selectable graphical element having metadata extracted from a second issue managed by the issue tracking system;

in response to user input provided to the first issue graphical element, causing display of a relational wiring graphical element connected to the first issue graphical element;

in response to a user input directing the relational wiring graphical element to the second issue graphical element:

connecting the relational wiring graphical element to the second issue graphical element;

querying the issue tracking system for issue data relating to the first issue and the second issue;

determining, using the issue data and one or more rules defining relationship types between issues of the issue tracking system, a set of relationship types that can be defined between the first issue and the second issue;

causing display of a relationship selector graphical element comprising selectable options corresponding to each of the set of relationship types and configured to accept a user input specifying one of the set of relationships types to define an issue relationship between the first issue and the second issue; and in response to user input selecting a relationship type from the set of relationship types at the relationship selector graphical element:

displaying an indication of the selected relationship type as part of the relational wiring graphical element; and generating an application programming interface (API) call to the issue tracking system to create the selected relationship type between the first issue and the second issue.

2. The computer-implemented method of claim 1, wherein:

the API call is a first API call; and causing display of the first issue graphical element comprises:

in response to user input provided to the shared editor region, causing display of an object creation interface, the object creation interface having a query field and a query result region;

in response to user input to the query field:

generating an issue query to the issue tracking system using a second API call;

receiving a set of matching issues satisfying the issue query from the issue tracking system; and for each matching issue of the set of matching issues, causing generation of a result graphical element in the query result region, the result graphical element having metadata extracted from the matching issue; and in response to user input selecting the result graphical element having metadata extracted from the first issue, causing display of the first issue graphical element.

3. The computer-implemented method of claim 2, wherein causing display of the second issue graphical element comprises:

in response to user input provided to the shared editor region, causing display of an object creation interface, the object creation interface having one or more input fields for receiving the user input;

in response to receiving the user input in the one or more input fields, generating a third API call to the issue tracking system to cause the second issue to be created; and causing display of the second issue graphical element.

4. The computer-implemented method of claim 1, wherein the shared editor region is configured to generate graphical elements in response to concurrent inputs received from multiple users.

5. The computer-implemented method of claim 1, wherein the user input directing the relational wiring graphical element to the second issue graphical element is a cursor dragging operation that is initiated at the first issue graphical element and terminates near the second issue graphical element.

6. The computer-implemented method of claim 1, further comprising:

in response to user input provided to a relational wiring graphical region of the first issue graphical element, causing display of a relational wiring control graphical element, wherein the display of the relational wiring graphical element is in response to user input provided to the relational wiring control graphical element.

7. The computer-implemented method of claim 6, wherein the relational wiring control graphical element is generated in response to a hover operation over the relational wiring graphical region.

8. The computer-implemented method of claim 1, further comprising:

in response to the user input selecting the relationship type, causing the relationship selector graphical element to be hidden.

9. The computer-implemented method of claim 8, further comprising:

in response to user input provided to the wiring control graphical element, causing the relationship selector graphical element to be displayed; and in response to user input updating the relationship type at the relationship selector graphical element, generating a second API call to the issue tracking system to cause the relationship type between the first issue and the second issue to be changed from a first relationship type to a second relationship type.

10. The computer-implemented method of claim 9, wherein:

the user input selecting the relationship type is provided by a first user; and the user input updating the relationship type is provided by a second user different than the first user.

11. A computer-implemented method for organizing issues in a virtual whiteboarding application, the computer-implemented method comprising:

causing display of a graphical user interface of the virtual whiteboarding application at a client device, the graphical user interface including a shared editor region configured to generate graphical elements in response to concurrent input received from multiple users;

causing display of a first issue graphical element in the shared editor region, the first issue graphical element being a graphical element selectable to cause display of a first issue in an issue tracking system, the first issue graphical element including data extracted from the first issue;

causing display of a second issue graphical element in the shared editor region, the second issue graphical element being a graphical element selectable to display a second issue in the issue tracking system, the second issue graphical element including data extracted from the second issue;

in response to an input dragging operation in the shared editor region initiated at the first issue graphical element and ending near the second issue graphical element:

causing display of a relational wiring graphical element between the first issue graphical element and the second issue graphical element;

querying the issue tracking system for issue data relating to the first issue and the second issue;

determining, using the issue data and one or more rules defining relationship types between issues of the issue tracking system, a set of relationship types that can be defined between the first issue and the second issue;

causing display of a relationship selector graphical element comprising selectable options corresponding to each of the set of relationship types and configured to accept a user input specifying one of the set of relationships types to define an issue relationship between the first issue and the second issue; and in response to user input selecting a relationship type from the set of relationship types at the relationship selector graphical element, generating a first application programming interface (API) call to the issue tracking system to cause the selected relationship type to be created between the first issue and the second issue within the issue tracking system; and in response to user input updating a relationship type between the first issue graphical element and the second issue graphical element, generating a second API call to the issue tracking system to cause a change in the relationship type between the first issue and the second issue.

12. The computer-implemented method of claim 11, wherein causing display of the first issue graphical element comprises:

in response to user input provided to the shared editor region, causing display of an object creation interface, the object creation interface having a query field and a query result region;

in response to user input provided to the query field:
generating an issue query to the issue tracking system using a third API call;
receiving a set of matching issues satisfying the issue query, the set of matching issues received from the issue tracking system; and
for each matching issue of the set of matching issues, causing generation of a result graphical element in the query result region, the result graphical element having data extracted from a matching issue; and in response to user input selecting the result graphical element having data extracted from the first issue, causing display of the first issue graphical element.

13. The computer-implemented method of claim 12, wherein causing display of the second issue graphical element comprises:

in response to user input provided to the shared editor region, causing display of an object creation interface, the object creation interface having one or more input fields receiving user input;

in response to the user input in the one or more input fields, generating a fourth API call to the issue tracking system to cause the second issue to be created; and
causing display of the second issue graphical element.

14. The computer-implemented method of claim 11, further comprising:

in response to user input provided to a relational wiring graphical region of the first issue graphical element, causing display of a relational wiring control graphical element, wherein:
the display of the relational wiring graphical element is in response to the user input provided to the relational wiring control graphical element; and
the relational wiring control graphical element of the first issue graphical element is displayed in response to a hover operation over one or more wiring control regions of the first issue graphical element.

15. The computer-implemented method of claim 11, further comprising:

in response to the input dragging operation in the shared editor region ending near the second issue graphical element, causing display of the relationship type selector graphical element configured to accept an initial relationship type, wherein the initial relationship type is determined in response to a third API call to the issue tracking system.

16. A computer processing system configured to operate a virtual whiteboarding platform, the system comprising:
a processing unit;
a non-transitory computer readable storage medium storing instructions, which when executed by the processing unit causes the processing unit to:
cause display of a graphical user interface at a frontend application, the graphical user interface including a shared editor region configured to generate graphical elements in response to concurrent inputs received from multiple users, the frontend application operably coupled to a backend application of the virtual whiteboarding platform;
cause display of a first issue graphical element in the shared editor region, the first issue graphical element having metadata extracted from a first issue in an issue tracking system;
cause display of a second issue graphical element in the shared editor region, the second issue graphical element having metadata extracted from a second issue in the issue tracking system;
in response to user input provided to the first issue graphical element, cause display of a relational wiring graphical element connected to the first issue graphical element;
in response to an input dragging operation:
connect the relational wiring graphical element to the second issue graphical element;
query the issue tracking system for issue data relating to the first issue and the second issue;
determine, using the issue data and one or more rules defining relationship types between issues of the issue tracking system, a set of relationship types that can be defined between the first issue and the second issue;
cause display of a relationship selector graphical element comprising selectable options corresponding to each of the set of relationship types and configured to accept a user input specifying one of the set of relationships types to define an issue relationship between the first issue and the second issue; and in response to user input selecting a relationship type from the set of relationship types at the relationship selector graphical element:

cause display of an indication of the selected relationship type as part of the relational wiring graphical element; and generate an application programming interface (API) call to the issue tracking system to cause the selected relationship type to be created between the first issue and the second issue.

17. The system of claim 16, wherein:
the API call is a first API call; and
causing display of the first issue graphical element comprises:
in response to user input provided to the shared editor region, causing display of an object creation interface, the object creation interface having a query field and a query result region;
in response to user input provided to the query field:
generating an issue query to the issue tracking system using a second API call;
receiving a set of matching issues satisfying the search query from the issue tracking system; and
for each matching issue of the set of matching issues, causing generation of a result graphical element in the query result region, the result graphical element having metadata extracted from a matching issue; and
in response to user input selecting the result graphical element having metadata extracted from the first issue, causing display of the first issue graphical element.

18. The system of claim 17, wherein causing display of the second issue graphical element comprises:
in response to user input provided to the shared editor region, causing display of an object creation interface, the object creation interface having one or more input fields for receiving the user input;
in response to receiving the user input in the one or more input fields, generating a third API call to the issue tracking system to cause the second issue to be created; and
causing display of the second issue graphical element.

19. The system of claim 16, wherein the virtual whiteboarding backend application is further configured to:
in response to user input updating the relationship type between the first issue graphical element and the second issue graphical element, generating a second API call to the issue tracking system to cause the relationship type between the first issue and the second issue to be changed from a first relationship type to a second relationship type.

20. The system of claim 16, further comprising:
in response to user input provided to a relational wiring graphical region of the first issue graphical element, causing display of a relational wiring control graphical element, wherein:
the display of the relational wiring graphical element is in response to the user input provided to the relational wiring control graphical element; and
the relational wiring control graphical element is generated in response to a hover operation over the relational wiring graphical region.

* * * * *